(12) United States Patent
Chakravarty et al.

(10) Patent No.: US 11,361,536 B2
(45) Date of Patent: Jun. 14, 2022

(54) MACHINE-LEARNING-ASSISTED SELF-IMPROVING OBJECT-IDENTIFICATION SYSTEM AND METHOD

(71) Applicant: Position Imaging, Inc., Portsmouth, NH (US)

(72) Inventors: Narasimhachary Nallana Chakravarty, Rollingsford, NH (US); Guohua Min, Exeter, NH (US); Edward L. Hill, Conway, NH (US); Brett Bilbrey, Sunnyvale, CA (US)

(73) Assignee: Position Imaging, Inc., Portsmouth, NH (US)

( * ) Notice: Subject to any disclaimer, the term of this patent is extended or adjusted under 35 U.S.C. 154(b) by 89 days.

(21) Appl. No.: 16/575,837

(22) Filed: Sep. 19, 2019

(65) Prior Publication Data

US 2020/0097724 A1 Mar. 26, 2020

Related U.S. Application Data

(60) Provisional application No. 62/734,491, filed on Sep. 21, 2018.

(51) Int. Cl.
*G06V 20/00* (2022.01)
*G06V 20/10* (2022.01)
*G06T 7/20* (2017.01)
(52) U.S. Cl.
CPC ............ *G06V 20/10* (2022.01); *G06T 7/20* (2013.01); *G06T 2207/20081* (2013.01); *G06T 2207/20084* (2013.01)
(58) Field of Classification Search
CPC ............. G06K 9/00664; G06T 7/20; G06T 2207/20081; G06T 2207/20084
(Continued)

(56) References Cited

U.S. PATENT DOCUMENTS 2,408,122 A 9/1946 Wirkler
3,824,596 A 7/1974 Guion et al.
(Continued)

FOREIGN PATENT DOCUMENTS

DE 102017205958 A1 10/2018
WO 2001006401 A1 1/2001
(Continued)

OTHER PUBLICATIONS

International Search Report and Written Opinion in PCT/US2019/051874 dated Dec. 13, 2020; 9 pages.
(Continued)

*Primary Examiner* — Michael R Neff
(74) *Attorney, Agent, or Firm* — Schmeiser, Olsen & Watts LLP

(57) ABSTRACT

A system and method of identifying and tracking objects comprises registering an identity of a person who visits an area designated for holding objects, capturing an image of the area designated for holding objects, submitting a version of the image to a deep neural network trained to detect and recognize objects in images like those objects held in the designated area, detecting an object in the version of the image, associating the registered identity of the person with the detected object, retraining the deep neural network using the version of the image if the deep neural network is unable to recognize the detected object, and tracking a location of the detected object while the detected object is in the area designated for holding objects.

21 Claims, 10 Drawing Sheets

(58) Field of Classification Search
USPC ........................................................ 382/104
See application file for complete search history.

(56) References Cited

U.S. PATENT DOCUMENTS

| | | | |
|---|---|---|---|
| 3,940,700 A | 2/1976 | Fischer |
| 4,018,029 A | 4/1977 | Safranski et al. |
| 4,328,499 A | 5/1982 | Anderson et al. |
| 4,570,416 A | 2/1986 | Shoenfeld |
| 5,010,343 A | 4/1991 | Andersson |
| 5,343,212 A | 8/1994 | Rose et al. |
| 5,426,438 A | 6/1995 | Peavey et al. |
| 5,510,800 A | 4/1996 | McEwan |
| 5,545,880 A | 8/1996 | Bu et al. |
| 5,574,468 A | 11/1996 | Rose |
| 5,592,180 A | 1/1997 | Yokev et al. |
| 5,600,330 A | 2/1997 | Blood |
| 5,657,026 A | 8/1997 | Culpepper et al. |
| 5,671,362 A | 9/1997 | Cowe et al. |
| 5,923,286 A | 7/1999 | Divakaruni |
| 5,953,683 A | 9/1999 | Hansen et al. |
| 6,088,653 A | 7/2000 | Sheikh et al. |
| 6,101,178 A | 8/2000 | Beal |
| 6,167,347 A | 12/2000 | Lin |
| 6,255,991 B1 | 7/2001 | Hedin |
| 6,285,916 B1 | 9/2001 | Kadaba et al. |
| 6,292,750 B1 | 9/2001 | Lin |
| 6,409,687 B1 | 6/2002 | Foxlin |
| 6,417,802 B1 | 7/2002 | Diesel |
| 6,492,905 B2 | 12/2002 | Mathias et al. |
| 6,496,778 B1 | 12/2002 | Lin |
| 6,512,748 B1 | 1/2003 | Mizuki et al. |
| 6,593,885 B2 | 7/2003 | Wisherd et al. |
| 6,619,550 B1 | 9/2003 | Good et al. |
| 6,630,904 B2 | 10/2003 | Guslafson et al. |
| 6,634,804 B1 | 10/2003 | Toste et al. |
| 6,683,568 B1 | 1/2004 | James et al. |
| 6,697,736 B2 | 2/2004 | Lin |
| 6,720,920 B2 | 4/2004 | Breed et al. |
| 6,721,657 B2 | 4/2004 | Ford et al. |
| 6,744,436 B1 | 6/2004 | Chirieleison, Jr. et al. |
| 6,750,816 B1 | 6/2004 | Kunysz |
| 6,861,982 B2 | 3/2005 | Forstrom et al. |
| 6,867,774 B1 | 3/2005 | Halmshaw et al. |
| 6,988,079 B1 | 1/2006 | Or-Bach et al. |
| 6,989,789 B2 | 1/2006 | Ferreol et al. |
| 7,009,561 B2 | 3/2006 | Menache et al. |
| 7,104,453 B1 | 9/2006 | Zhu et al. |
| 7,143,004 B2 | 11/2006 | Townsend et al. |
| 7,168,618 B2 | 1/2007 | Schwartz |
| 7,190,309 B2 | 3/2007 | Hill |
| 7,193,559 B2 | 3/2007 | Ford et al. |
| 7,236,091 B2 | 6/2007 | Kiang et al. |
| 7,292,189 B2 | 11/2007 | Orr et al. |
| 7,295,925 B2 | 11/2007 | Breed et al. |
| 7,315,281 B2 | 1/2008 | Dejanovic et al. |
| 7,336,078 B1 | 2/2008 | Merewether et al. |
| 7,353,994 B2 | 4/2008 | Farrall et al. |
| 7,409,290 B2 | 8/2008 | Lin |
| 7,443,342 B2 | 10/2008 | Shirai et al. |
| 7,499,711 B2 | 3/2009 | Hoctor et al. |
| 7,533,569 B2 | 5/2009 | Sheynblat |
| 7,612,715 B2 | 11/2009 | Macleod |
| 7,646,330 B2 | 1/2010 | Karr |
| 7,689,465 B1 | 3/2010 | Shakes et al. |
| 7,844,507 B2 | 11/2010 | Levy |
| 7,868,760 B2 | 1/2011 | Smith et al. |
| 7,876,268 B2 | 1/2011 | Jacobs |
| 7,933,730 B2 | 4/2011 | Li et al. |
| 7,995,109 B2 | 8/2011 | Kamada et al. |
| 8,009,918 B2 | 8/2011 | Van Droogenbroeck et al. |
| 8,189,855 B2 | 5/2012 | Opalach et al. |
| 8,201,737 B1 | 6/2012 | Palacios Durazo et al. |
| 8,219,438 B1 | 7/2012 | Moon et al. |
| 8,269,624 B2 | 9/2012 | Chen et al. |
| 8,295,542 B2 | 10/2012 | Albertson et al. |
| 8,406,470 B2 | 3/2013 | Jones et al. |
| 8,457,655 B2 | 6/2013 | Zhang et al. |
| 8,619,144 B1 | 12/2013 | Chang et al. |
| 8,749,433 B2 | 6/2014 | Hill |
| 8,843,231 B2 | 9/2014 | Ragusa et al. |
| 8,860,611 B1 | 10/2014 | Anderson et al. |
| 8,957,812 B1 | 2/2015 | Hill et al. |
| 9,063,215 B2 | 6/2015 | Perthold et al. |
| 9,092,898 B1 | 7/2015 | Fraccaroli et al. |
| 9,120,621 B1 | 9/2015 | Curlander et al. |
| 9,141,194 B1 | 9/2015 | Keyes et al. |
| 9,171,278 B1 | 10/2015 | Kong et al. |
| 9,174,746 B1 | 11/2015 | Bell et al. |
| 9,269,022 B2 | 2/2016 | Rhoads et al. |
| 9,349,076 B1 | 5/2016 | Liu et al. |
| 9,424,493 B2 | 8/2016 | He et al. |
| 9,482,741 B1 | 11/2016 | Min et al. |
| 9,497,728 B2 | 11/2016 | Hill |
| 9,500,396 B2 | 11/2016 | Yoon et al. |
| 9,514,389 B1 | 12/2016 | Erhan et al. |
| 9,519,344 B1 | 12/2016 | Hill |
| 9,544,552 B2 | 1/2017 | Takahashi |
| 9,594,983 B2 | 3/2017 | Alattar et al. |
| 9,656,749 B1 | 5/2017 | Hanlon |
| 9,740,937 B2 | 8/2017 | Zhang et al. |
| 9,782,669 B1 | 10/2017 | Hill |
| 9,872,151 B1 | 1/2018 | Puzanov et al. |
| 9,904,867 B2 | 2/2018 | Fathi et al. |
| 9,933,509 B2 | 4/2018 | Hill et al. |
| 9,961,503 B2 | 5/2018 | Hill |
| 9,996,818 B1 | 6/2018 | Ren et al. |
| 10,001,833 B2 | 6/2018 | Hill |
| 10,148,918 B1 | 12/2018 | Seiger et al. |
| 10,163,149 B1 | 12/2018 | Famularo et al. |
| 10,180,490 B1 | 1/2019 | Schneider et al. |
| 10,257,654 B2 | 4/2019 | Hill |
| 10,324,474 B2 | 6/2019 | Hill et al. |
| 10,332,066 B1 | 6/2019 | Palaniappan et al. |
| 10,373,322 B1 * | 8/2019 | Buibas ............... G06K 9/00201 |
| 10,399,778 B1 | 9/2019 | Shekhawat et al. |
| 10,416,276 B2 | 9/2019 | Hill et al. |
| 10,444,323 B2 | 10/2019 | Min et al. |
| 10,455,364 B2 | 10/2019 | Hill |
| 10,605,904 B2 | 3/2020 | Min et al. |
| 10,949,799 B2 | 3/2021 | Chaubard |
| 11,080,559 B2 | 8/2021 | Chaubard |
| 2001/0027995 A1 | 10/2001 | Patel et al. |
| 2002/0021277 A1 | 2/2002 | Kramer et al. |
| 2002/0095353 A1 | 7/2002 | Razumov |
| 2002/0140745 A1 | 10/2002 | Ellenby et al. |
| 2002/0177476 A1 | 11/2002 | Chou |
| 2003/0024987 A1 | 2/2003 | Zhu |
| 2003/0053492 A1 | 3/2003 | Matsunaga |
| 2003/0110152 A1 | 6/2003 | Hara |
| 2003/0115162 A1 | 6/2003 | Konick |
| 2003/0120425 A1 | 6/2003 | Stanley et al. |
| 2003/0176196 A1 | 9/2003 | Hall et al. |
| 2003/0184649 A1 | 10/2003 | Mann |
| 2003/0195017 A1 | 10/2003 | Chen et al. |
| 2004/0002642 A1 | 1/2004 | Dekel et al. |
| 2004/0095907 A1 | 5/2004 | Agee et al. |
| 2004/0107072 A1 | 6/2004 | Dietrich et al. |
| 2004/0176102 A1 | 9/2004 | Lawrence et al. |
| 2004/0203846 A1 | 10/2004 | Caronni et al. |
| 2004/0267640 A1 | 12/2004 | Bong et al. |
| 2005/0001712 A1 | 1/2005 | Yarbrough |
| 2005/0057647 A1 | 3/2005 | Nowak |
| 2005/0062849 A1 | 3/2005 | Foth et al. |
| 2005/0074162 A1 | 4/2005 | Tu et al. |
| 2005/0143916 A1 | 6/2005 | Kim et al. |
| 2005/0154685 A1 | 7/2005 | Mundy et al. |
| 2005/0184907 A1 | 8/2005 | Hall et al. |
| 2005/0275626 A1 | 12/2005 | Mueller et al. |
| 2006/0013070 A1 | 1/2006 | Holm et al. |
| 2006/0022800 A1 | 2/2006 | Krishna et al. |
| 2006/0061469 A1 | 3/2006 | Jaeger et al. |
| 2006/0066485 A1 | 3/2006 | Min |
| 2006/0101497 A1 | 5/2006 | Hirt et al. |

(56) References Cited

U.S. PATENT DOCUMENTS

| | | |
|---|---|---|
| 2006/0192709 A1 | 8/2006 | Schantz et al. |
| 2006/0279459 A1 | 12/2006 | Akiyama et al. |
| 2006/0290508 A1 | 12/2006 | Moutchkaev et al. |
| 2007/0060384 A1 | 3/2007 | Dohta |
| 2007/0138270 A1 | 6/2007 | Reblin |
| 2007/0205867 A1 | 9/2007 | Kennedy et al. |
| 2007/0210920 A1 | 9/2007 | Panotopoulos |
| 2007/0222560 A1 | 9/2007 | Posamentier |
| 2007/0237356 A1 | 10/2007 | Dwinell et al. |
| 2008/0007398 A1 | 1/2008 | DeRose et al. |
| 2008/0035390 A1 | 2/2008 | Wurz |
| 2008/0048913 A1 | 2/2008 | Macias et al. |
| 2008/0143482 A1 | 6/2008 | Shoarinejad et al. |
| 2008/0150678 A1 | 6/2008 | Giobbi et al. |
| 2008/0154691 A1 | 6/2008 | Wellman et al. |
| 2008/0156619 A1 | 7/2008 | Patel et al. |
| 2008/0174485 A1 | 7/2008 | Carani et al. |
| 2008/0183328 A1 | 7/2008 | Danelski |
| 2008/0204322 A1 | 8/2008 | Oswald et al. |
| 2008/0266253 A1 | 10/2008 | Seeman et al. |
| 2008/0281618 A1 | 11/2008 | Mermet et al. |
| 2008/0316324 A1 | 12/2008 | Rofougaran et al. |
| 2009/0043504 A1 | 2/2009 | Bandyopadhyay et al. |
| 2009/0073428 A1 | 3/2009 | Magnus et al. |
| 2009/0114575 A1 | 5/2009 | Carpenter et al. |
| 2009/0121017 A1 | 5/2009 | Cato et al. |
| 2009/0149202 A1 | 6/2009 | Hill et al. |
| 2009/0224040 A1 | 9/2009 | Kushida et al. |
| 2009/0243932 A1 | 10/2009 | Moshfeghi |
| 2009/0245573 A1* | 10/2009 | Saptharishi .......... G06K 9/52 382/103 |
| 2009/0323586 A1 | 12/2009 | Hohl et al. |
| 2010/0019905 A1 | 1/2010 | Boddie et al. |
| 2010/0076594 A1 | 3/2010 | Salour et al. |
| 2010/0090852 A1 | 4/2010 | Eitan et al. |
| 2010/0097208 A1 | 4/2010 | Rosing et al. |
| 2010/0103173 A1 | 4/2010 | Lee et al. |
| 2010/0103989 A1 | 4/2010 | Smith et al. |
| 2010/0123664 A1 | 5/2010 | Shin et al. |
| 2010/0159958 A1 | 6/2010 | Naguib et al. |
| 2011/0002509 A1 | 1/2011 | Nobori et al. |
| 2011/0006774 A1 | 1/2011 | Baiden |
| 2011/0037573 A1 | 2/2011 | Choi |
| 2011/0066086 A1 | 3/2011 | Aarestad et al. |
| 2011/0166694 A1 | 7/2011 | Griffits et al. |
| 2011/0187600 A1 | 8/2011 | Landt |
| 2011/0208481 A1 | 8/2011 | Slastion |
| 2011/0210843 A1 | 9/2011 | Kummetz |
| 2011/0241942 A1 | 10/2011 | Hill |
| 2011/0256882 A1 | 10/2011 | Markhovsky et al. |
| 2011/0264520 A1 | 10/2011 | Puhakka |
| 2011/0286633 A1 | 11/2011 | Wang et al. |
| 2011/0313893 A1 | 12/2011 | Weik, III |
| 2011/0315770 A1 | 12/2011 | Patel et al. |
| 2012/0013509 A1 | 1/2012 | Wisherd et al. |
| 2012/0020518 A1 | 1/2012 | Taguchi |
| 2012/0081544 A1 | 4/2012 | Wee |
| 2012/0087572 A1 | 4/2012 | Dedeoglu et al. |
| 2012/0127088 A1 | 5/2012 | Pance et al. |
| 2012/0176227 A1 | 7/2012 | Nikitin |
| 2012/0184285 A1 | 7/2012 | Sampath et al. |
| 2012/0257061 A1 | 10/2012 | Edwards et al. |
| 2012/0286933 A1 | 11/2012 | Hsiao |
| 2012/0319822 A1 | 12/2012 | Hansen |
| 2013/0018582 A1 | 1/2013 | Miller et al. |
| 2013/0021417 A1 | 1/2013 | Ota et al. |
| 2013/0029685 A1 | 1/2013 | Moshfeghi |
| 2013/0036043 A1 | 2/2013 | Faith |
| 2013/0051624 A1 | 2/2013 | Iwasaki et al. |
| 2013/0063567 A1 | 3/2013 | Burns et al. |
| 2013/0073093 A1 | 3/2013 | Songkakul |
| 2013/0113993 A1 | 5/2013 | Dagit, III |
| 2013/0182114 A1 | 7/2013 | Zhang et al. |
| 2013/0191193 A1 | 7/2013 | Calman et al. |
| 2013/0226655 A1 | 8/2013 | Shaw |
| 2013/0281084 A1 | 10/2013 | Batada et al. |
| 2013/0293684 A1 | 11/2013 | Becker et al. |
| 2013/0293722 A1 | 11/2013 | Chen |
| 2013/0314210 A1 | 11/2013 | Schoner et al. |
| 2013/0335318 A1 | 12/2013 | Nagel et al. |
| 2013/0335415 A1 | 12/2013 | Chang |
| 2014/0022058 A1 | 1/2014 | Striemer et al. |
| 2014/0108136 A1 | 4/2014 | Zhao et al. |
| 2014/0139426 A1 | 5/2014 | Kryze et al. |
| 2014/0253368 A1 | 9/2014 | Holder |
| 2014/0270356 A1 | 9/2014 | Dearing et al. |
| 2014/0300516 A1 | 10/2014 | Min et al. |
| 2014/0317005 A1 | 10/2014 | Balwani |
| 2014/0330603 A1 | 11/2014 | Corder et al. |
| 2014/0357295 A1 | 12/2014 | Skomra et al. |
| 2014/0361078 A1 | 12/2014 | Davidson |
| 2015/0009949 A1 | 1/2015 | Khoryaev et al. |
| 2015/0012396 A1 | 1/2015 | Puerini et al. |
| 2015/0019391 A1 | 1/2015 | Kumar et al. |
| 2015/0029339 A1 | 1/2015 | Kobres et al. |
| 2015/0039458 A1 | 2/2015 | Reid |
| 2015/0055821 A1 | 2/2015 | Fotland |
| 2015/0059374 A1 | 3/2015 | Hebel |
| 2015/0085096 A1 | 3/2015 | Smits |
| 2015/0091757 A1 | 4/2015 | Shaw et al. |
| 2015/0130664 A1 | 5/2015 | Hill et al. |
| 2015/0133162 A1 | 5/2015 | Meredith et al. |
| 2015/0134418 A1 | 5/2015 | Leow et al. |
| 2015/0169916 A1 | 6/2015 | Hill et al. |
| 2015/0170002 A1 | 6/2015 | Szegedy et al. |
| 2015/0202770 A1 | 7/2015 | Patron et al. |
| 2015/0210199 A1 | 7/2015 | Payne |
| 2015/0221135 A1 | 8/2015 | Hill et al. |
| 2015/0227890 A1 | 8/2015 | Bednarek et al. |
| 2015/0248765 A1 | 9/2015 | Criminisi et al. |
| 2015/0254906 A1 | 9/2015 | Berger et al. |
| 2015/0278759 A1 | 10/2015 | Harris et al. |
| 2015/0310539 A1 | 10/2015 | McCoy et al. |
| 2015/0323643 A1 | 11/2015 | Hill et al. |
| 2015/0341551 A1 | 11/2015 | Perrin et al. |
| 2015/0362581 A1 | 12/2015 | Friedman et al. |
| 2015/0371178 A1 | 12/2015 | Abhyanker et al. |
| 2015/0371319 A1 | 12/2015 | Argue et al. |
| 2015/0379366 A1 | 12/2015 | Nomura et al. |
| 2016/0035078 A1 | 2/2016 | Lin et al. |
| 2016/0063610 A1 | 3/2016 | Argue et al. |
| 2016/0093184 A1 | 3/2016 | Locke et al. |
| 2016/0098679 A1 | 4/2016 | Levy |
| 2016/0140436 A1 | 5/2016 | Yin et al. |
| 2016/0142868 A1 | 5/2016 | Kulkarni et al. |
| 2016/0150196 A1 | 5/2016 | Horvath |
| 2016/0156409 A1 | 6/2016 | Chang |
| 2016/0178727 A1 | 6/2016 | Bottazzi |
| 2016/0195602 A1 | 7/2016 | Meadow |
| 2016/0232857 A1 | 8/2016 | Tamaru |
| 2016/0238692 A1 | 8/2016 | Hill et al. |
| 2016/0248969 A1 | 8/2016 | Hurd |
| 2016/0256100 A1 | 9/2016 | Jacofsky et al. |
| 2016/0286508 A1 | 9/2016 | Khoryaev et al. |
| 2016/0300187 A1 | 10/2016 | Kashi et al. |
| 2016/0335593 A1 | 11/2016 | Clarke et al. |
| 2016/0366561 A1 | 12/2016 | Min et al. |
| 2016/0370453 A1 | 12/2016 | Boker et al. |
| 2016/0371574 A1 | 12/2016 | Nguyen et al. |
| 2017/0030997 A1 | 2/2017 | Hill et al. |
| 2017/0031432 A1 | 2/2017 | Hill |
| 2017/0066597 A1 | 3/2017 | Hiroi |
| 2017/0117233 A1 | 4/2017 | Anayama et al. |
| 2017/0123426 A1 | 5/2017 | Hill et al. |
| 2017/0140329 A1 | 5/2017 | Bernhardt et al. |
| 2017/0234979 A1 | 8/2017 | Mathews et al. |
| 2017/0261592 A1 | 9/2017 | Min et al. |
| 2017/0280281 A1 | 9/2017 | Pandey et al. |
| 2017/0293885 A1 | 10/2017 | Grady et al. |
| 2017/0313514 A1 | 11/2017 | Lert, Jr. et al. |
| 2017/0323174 A1 | 11/2017 | Joshi et al. |
| 2017/0323376 A1 | 11/2017 | Glaser et al. |
| 2017/0350961 A1 | 12/2017 | Hill et al. |
| 2017/0351255 A1 | 12/2017 | Anderson et al. |

(56) References Cited

U.S. PATENT DOCUMENTS

| | | | |
|---|---|---|---|
| 2017/0359573 | A1 | 12/2017 | Kim et al. |
| 2017/0372524 | A1 | 12/2017 | Hill |
| 2017/0374261 | A1 | 12/2017 | Teich et al. |
| 2018/0003962 | A1 | 1/2018 | Urey et al. |
| 2018/0033151 | A1 | 2/2018 | Matsumoto et al. |
| 2018/0068100 | A1 | 3/2018 | Seo |
| 2018/0068266 | A1 | 3/2018 | Kirmani et al. |
| 2018/0094936 | A1 | 4/2018 | Jones et al. |
| 2018/0108134 | A1 | 4/2018 | Venable et al. |
| 2018/0139431 | A1 | 5/2018 | Simek et al. |
| 2018/0164103 | A1 | 6/2018 | Hill |
| 2018/0197139 | A1 | 7/2018 | Hill |
| 2018/0197218 | A1 | 7/2018 | Mallesan et al. |
| 2018/0231649 | A1 | 8/2018 | Min et al. |
| 2018/0242111 | A1 | 8/2018 | Hill |
| 2018/0339720 | A1 | 11/2018 | Singh |
| 2019/0029277 | A1 | 1/2019 | Skr et al. |
| 2019/0053012 | A1 | 2/2019 | Hill |
| 2019/0073785 | A1 | 3/2019 | Hafner et al. |
| 2019/0090744 | A1 | 3/2019 | Mahfouz |
| 2019/0098263 | A1 | 3/2019 | Seiger et al. |
| 2019/0138849 | A1* | 5/2019 | Zhang .................. G06K 9/6215 |
| 2019/0295290 | A1 | 9/2019 | Schena et al. |
| 2019/0394448 | A1* | 12/2019 | Ziegler .................. G01S 17/08 |
| 2020/0005116 | A1* | 1/2020 | Kuo ........................ G06N 20/00 |
| 2020/0011961 | A1 | 1/2020 | Hill et al. |
| 2020/0012894 | A1* | 1/2020 | Lee .................... G06K 9/00624 |

FOREIGN PATENT DOCUMENTS

| | | |
|---|---|---|
| WO | 2005010550 A1 | 2/2005 |
| WO | 2009007198 A1 | 1/2009 |

OTHER PUBLICATIONS

Final Office Action in U.S. Appl. No. 15/091,180, dated Mar. 10, 2021; 24 pages.

Notice of Allowance and Fees Due in U.S. Appl. No. 16/206,745, dated Mar. 12, 2021; 9 pages.

Final Office Action in U.S. Appl. No. 15/259,474, dated Mar. 9, 2021; 23 pages.

Final Office Action in U.S. Appl. No. 15/861,414 dated Feb. 8, 2021.

Final Office Action in U.S. Appl. No. 16/437,767 dated Feb. 5, 2021.

International Preliminary Report on Patentability in PCT/US2019/051874 dated Apr. 1, 2021.

Non-Final Office Action in U.S. Appl. No. 16/740,679 dated Jan. 6, 2021.

Final Office Action in U.S. Appl. No. 15/416,379 dated Jan. 27, 2020; 15 pages.

Non-Final Office Action in U.S. Appl. No. 15/416,379, dated Jun. 27, 2019; 12 pages.

Non-Final Office Action in U.S. Appl. No. 15/861,414 dated Apr. 6, 2020; 14 pages.

Morbella N50: 5-inch GPS Navigator User's Manual, Maka Technologies Group, May 2012.

Final Office Action in U.S. Appl. No. 16/206,745 dated May 22, 2019; 9 pages.

Non-Final Office Action in U.S. Appl. No. 15/416,366 dated Jun. 13, 2019; 11 pages.

Non-Final Office Action in U.S. Appl. No. 16/206,745 dated Jan. 7, 2019; 10 pages.

Non-Final Office Action in U.S. Appl. No. 15/259,474 dated May 29, 2019; 19 pages.

Wilde, Andreas, "Extended Tracking Range Delay-Locked Loop," Proceedings IEEE International Conference on Communications, Jun. 1995, pp. 1051-1054.

Notice of Allowance in U.S. Appl. No. 15/270,749 dated Oct. 4, 2018; 5 pages.

Li, et al. "Multifrequency-Based Range Estimation of RFID Tags," IEEE International Conference on RFID, 2009.

Welch, Greg and Gary Bishop, "An Introduction to the Kalman Filter," Department of Computer Science, University of North Carolina at Chapel Hill, Chapel Hill, NC 27599-3175, Updated: Monday, Jul. 24, 2006.

Non-Final Office Action in U.S. Appl. No. 15/270,749 dated Apr. 4, 2018; 8 pages.

"ADXL202/ADXL210 Product Sheet," Analog.com, 1999.

Pourhomayoun, Mohammad and Mark Fowler, "Improving WLAN-based Indoor Mobile Positioning Using Sparsity," Conference Record of the Forty Sixth Asilomar Conference on Signals, Systems and Computers, Nov. 4-7, 2012, pp. 1393-1396, Pacific Grove, California.

Schmidt & Phillips, "INS/GPS Integration Architectures", NATO RTO Lecture Seriers, First Presented Oct. 20-21, 2003.

Farrell & Barth, "The Global Positiong System & Interial Navigation", 1999, McGraw-Hill; pp. 245-252.

Grewal & Andrews, "Global Positioning Systems, Inertial Nagivation, and Integration", 2001, John Weiley and Sons, pp. 252-256.

Jianchen Gao, "Development of a Precise GPS/INS/On-Board Vehicle Sensors Integrated Vehicular Positioning System", Jun. 2007, UCGE Reports No. 20555.

Yong Yang, "Tightly Coupled MEMS INS/GPS Integration with INS Aided Receiver Tracking Loops", Jun. 2008, UCGE Reports No. 20270.

Goodall, Christopher L., "Improving Usability of Low-Cost INS/GPS Navigation Systems using Intelligent Techniques", Jan. 2009, UCGE Reports No. 20276.

Debo Sun, "Ultra-Tight GPS/Reduced IMU for Land Vehicle Navigation", Mar. 2010, UCGE Reports No. 20305.

Sun, et al., "Analysis of the Kalman Filter With Different INS Error Models for GPS/INS Integration in Aerial Remote Sensing Applications", Bejing, 2008, The International Archives of the Photogrammerty, Remote Sensing and Spatial Information Sciences vol. XXXVII, Part B5.

Adrian Schumacher, "Integration of a GPS aised Strapdown Inertial Navigation System for Land Vehicles", Master of Science Thesis, KTH Electrical Engineering, 2006.

Vikas Numar N., "Integration of Inertial Navigation System and Global Positioning System Using Kalman Filtering", M.Tech Dissertation, Indian Institute of Technology, Bombay, Mumbai, Jul. 2004.

Jennifer Denise Gautier, "GPS/INS Generalized Evaluation Tool (GIGET) for the Design and Testing of Integrated Navigation Systems", Dissertation, Stanford University, Jun. 2003.

Farrell, et al., "Real-Time Differential Carrier Phase GPS=Aided INS", Jul. 2000, IEEE Transactions on Control Systems Technology, vol. 8, No. 4.

Filho, et al., "Integrated GPS/INS Navigation System Based on a Gyrpscope-Free IMU", DINCON Brazilian Conference on Synamics, Control, and Their Applications, May 22-26, 2006.

Santiago Alban, "Design and Performance of a Robust GPS/INS Attitude System for Automobile Applications", Dissertation, Stanford University, Jun. 2004.

Proakis, John G. and Masoud Salehi, "Communication Systems Engineering", Second Edition, Prentice-Hall, Inc., Upper Saddle River, New Jersey, 2002.

International Search Report & Written Opinion in international patent application PCT/US12/64860, dated Feb. 28, 2013; 8 pages.

Non-Final Office Action in U.S. Appl. No. 15/091,180, dated Jun. 27, 2019; 11 pages.

Restriction Requirement in U.S. Appl. No. 15/091,180 dated Mar. 19, 2019; 8 pages.

Dictionary Definition for Peripheral Equipment. (2001). Hargrave's Communications Dictionary, Wiley. Hoboken, NJ: Wiley. Retrieved from Https://search.credorefernce.com/content/entry/hargravecomms/peripheral_equioment/0 (Year:2001).

Final Office Action in U.S. Appl. No. 15/091,180 dated Jan. 23, 2020; 17 pages.

Corrected Notice of Allowability in U.S. Appl. No. 15/270,749 dated Oct. 30, 2018; 5 pages.

(56) References Cited

OTHER PUBLICATIONS

Non-Final Office Action in U.S. Appl. No. 16/437,767, dated Jul. 15, 2020; 19 pages.
Notice of Allowance in U.S. Appl. No. 15/416,366 dated Aug. 19, 2020; 13 pages.
International Search Report and Written Opinion in PCT/US2020/013280 dated Mar. 10, 2020; 9 pages.
Raza, Rana Hammad "Three Dimensional Localization and Tracking for Site Safety Using Fusion of Computer Vision and RFID," 2013, Dissertation, Michigan State University.
Final Office Action in U.S. Appl. No. 15/259,474 dated Jan. 10, 2020; 19 pages.
Final Office Action in U.S. Appl. No. 16/206,745 dated Feb. 5, 2020; 15 pages.
Non-Final Office Action in U.S. Appl. No. 16/206,745 dated Oct. 18, 2019; 8 pages.
Final Office Action in U.S. Appl. No. 15/416,366 dated Oct. 7, 2019; 14 pages.
Non-Final Office Action in U.S. Appl. No. 15/416,366 dated Apr. 6, 2020; 13 pages.
Szeliski, Richard "Image Alignment and Stitching: A Tutorial,:" Technical Report, MST-TR-2004-92, Dec. 10, 2006.
Brown, Matthew and David G. Lowe "Automatic Panoramic Image Stitching using Invariant Features," International Journal of Computer Vision, vol. 74, No. 1, pp. 59-73, 2007.
Xu, Wei and Jane Mulligan "Performance Evaluation of Color Correction Approaches for Automatic Multi-view Image and Video Stitching," International Converence on Computer Vision and Pattern Recognition (CVPR10), San Francisco, CA, 2010.
Hill, et al. "Package Tracking Systems and Methods" U.S. Appl. No. 15/091,180, filed Apr. 5, 2016.
Hill, et al. "Video for Real-Time Confirmation in Package Tracking Systems" U.S. Appl. No. 15/416,366, filed Jan. 26, 2017.
Piotrowski, et al. "Light-Based Guidance for Package Tracking Systems" U.S. Appl. No. 15/416,379, filed Jan. 26, 2017.
Non-Final Office Action in U.S. Appl. No. 15/091,180 dated Oct. 1, 2020.
Non-Final Office Action in U.S. Appl. No. 16/206,745 dated Sep. 23, 2020.
Non-Final Office Action in U.S. Appl. No. 15/259,474, dated Sep. 1, 2020; 17 pages.
Final Office Action in U.S. Appl. No. 15/861,414 dated Nov. 17, 2020.
Non-Final Office Action in U.S. Appl. No. 15/416,379 dated Oct. 2, 2020.
Final Office Action in U.S. Appl. No. 15/416,379, dated May 13, 2021; 18 pages.
Notice of Allowance and Fees Due in U.S. Appl. No. 16/437,767, dated May 14, 2021; 8 pages.
Notice of Allowance and Fees Due in U.S. Appl. No. 16/740,679, dated Apr. 20, 2021; 15 pages.
Non-Final Office Action in U.S. Appl. No. 15/091,180 dated Sep. 1, 2021.
Ex Parte Quayle Action in U.S. Appl. No. 15/416,379 dated Oct. 5, 2021.
Non-Final Office Action in U.S. Appl. No. 15/259,474 dated Aug. 26, 2021.
Non-Final Office Action in U.S. Appl. No. 15/861,414 dated Aug. 26, 2021.
International Preliminary Report on Patentability in PCT/US2020/013280 dated Jul. 22, 2021.
Notice of Allowance in U.S. Appl. No. 15/416,379 dated Mar. 30, 2022.
Final Office Action in U.S. Appl. No. 15/259,474 dated Feb. 8, 2022.
Final Office Action in U.S. Appl. No. 15/861,414 dated Mar. 16, 2022.

* cited by examiner

MACHINE-LEARNING-ASSISTED SELF-IMPROVING OBJECT-IDENTIFICATION SYSTEM AND METHOD

CROSS-REFERENCE TO RELATED APPLICATION

This application claims priority to and the benefit of U.S. Provisional Application No. 62/734,491, titled "Machine-Learning-Assisted Self-Improving Object-identification System and Method", filed on Sep. 21, 2018, the entirety of which provisional application is incorporated by reference herein for all purposes.

FIELD OF THE INVENTION

The invention relates generally to machine-learning systems and methods for identifying objects.

BACKGROUND

Various consumer goods and retail operations are attempting to improve customers' shopping experience by automating the purchase and checkout process. Such automation entails deploying systems that can identify what items a customer has taken from a shelf. Some systems employ video monitoring and image processing techniques to identify those items. However, the proper detection and identification of an item in captured images can be affected by various factors, for example, lighting conditions, shadows, obstructed views, and the location and position of the item on the shelf. Inconsistent results render such systems ineffectual.

SUMMARY

All examples and features mentioned below can be combined in any technically possible way.

In one aspect, the invention is related to an object-identification system comprising an image sensor configured to capture images of objects disposed in an area designated for holding objects, a deep neural network trained to detect and recognize objects in images like those objects held in the designated area, and a controller in communication with the image sensor to receive images captured by the image sensor and with the deep neural network. The controller includes one or more processors configured to register an identity of a person who visits the area designated for holding objects, to submit an image to the deep neural network, to associate the registered identity of the person with an object detected in the image submitted to the deep neural network, to retrain the deep neural network using the submitted image if the deep neural network is unable to recognize the object detected in the submitted image, and to track a location of the detected object while the detected object is in the area designated for holding objects.

The controller may be further configured to acquire labeling information for the detected object in response to the deep neural network being unable to recognize the detected object in the submitted image, to associate the labeling information with the version of the image submitted to the deep neural network, and to store the version of the image and associated labeling information in an image database used to retrain the deep neural network. A human-input acquisition module may be configured to acquire the labeling information from a user in response to a request from the controller when the deep neural network is unable to recognize the detected object in the image in the submitted image.

The controller may be further configured to find an area within the image in which a change appears if the deep neural network is unable to recognize the detected object, to produce a version of the image that focuses upon the area of change, and to submit the version of the image to the deep neural network to determine whether the deep neural network is able to recognize the detected object in the second version of the image. The controller may be further configured to acquire labeling information for the detected object irrespective of whether the deep neural network recognizes the detected object in the submitted version of the image, to associate the acquired labeling information with the version of the image submitted to the deep neural network, and to store the version of the image and associated labeling information in an image database used to retrain the deep neural network. In addition, the controller may be further configured to acquire the labeling information from the deep neural network when the deep neural network recognizes the detected object in the submitted version of the image.

The deep neural network may be a first deep neural network, and the system may further comprise a second deep neural network configured to operate in parallel to the first deep neural network. Each of the first and second deep neural networks produce an output based on image data obtained from the image, wherein the image data obtained by the first deep neural network are different from the image data obtained by the second deep neural network.

The object-identification system may further comprise a depth sensor with a field of view that substantially matches a field of view of the image sensor. The depth sensor acquires depth pixels value of images within its field of view, wherein a depth pixel value and less than three pixel values taken from the group consisting of R (red), G (green), and B (blue) are submitted as image data to the deep neural network when the image is submitted to the deep neural network during training or object recognition.

The deep neural network may reside on a remote server system, and the controller may further comprise a network interface to communicate with the deep neural network on the server system.

In another aspect, the invention is related to a method of identifying and tracking objects. The method comprises the steps of registering an identity of a person who visits an area designated for holding objects, capturing an image of the area designated for holding objects, submitting a version of the image to a deep neural network trained to detect and recognize objects in images like those objects held in the designated area, detecting an object in the version of the image, associating the registered identity of the person with the detected object, retraining the deep neural network using the version of the image if the deep neural network is unable to recognize the detected object, and tracking a location of the detected object while the detected object is in the area designated for holding objects.

The method may further comprise acquiring labeling information for the object detected in the version of the image in response to the deep neural network being unable to recognize the detected object in the version of the image, associating the labeling information with the version of the image, and storing the version of the captured image and associated labeling information in an image database used to retrain the deep neural network. The step of acquiring labeling information for the object detected in the version of the image may be in response to the deep neural network being unable to recognize the detected object in the version of the image comprises acquiring the labeling information from user-supplied input.

The method may further comprise finding an area within the version of the image in which a change appears when the deep neural network is unable to recognize the object detected in the first version of the image, producing a second version of the image that focuses upon the found area of change, and submitting the second version of the image to the deep neural network to determine whether the deep neural network can recognize the detected object in the second version of the image. The method may further comprise acquiring labeling information for the object detected in the first version of the image irrespective of whether the deep neural network recognizes the detected object in the second version of the image, associating the labeling information with the first version of the image, and storing the first version of the captured image and associated labeling information in an image database used to retrain the deep neural network. The step of acquiring labeling information for the object detected in the version of the image may comprise acquiring the labeling information from the deep neural network when the deep neural network recognizes the detected object in the version of the image.

The step of submitting a version of the image to the deep neural network may comprises submitting a depth pixel value and less than three pixel values taken from the group consisting of R (red), G (green), and B (blue) as image data to the deep neural network.

The method may further comprise the step of submitting image data, acquired from the version of the image, to a first deep neural network and a second deep neural network in parallel, wherein the image data submitted to the first deep neural network are different from the image data submitted to the second deep neural network.

In another aspect, the invention is related to a sensor module comprising an image sensor configured to capture an image within its field of view and a depth sensor having a field of view that substantially matches the field of view of the image sensor. The depth sensor is configured to acquire estimated depth values for an image captured by the depth sensor. The sensor module further comprises a controller in communication with the image sensor and depth sensor to receive image data associated with the image captured by the image sensor and estimated depth values associated with the image captured by the depth sensor. The controller includes one or more processors configured to register an identity of a person who visits an area designated for holding objects, to submit the image data associated with the image captured by the image sensor and the estimated depth values associated with the image captured by the depth sensor to a deep neural network trained to detect and recognize objects in images like those objects held in the designated area, to associate the registered identity of the person with an object detected in the image data and estimated depth values submitted to the deep neural network, and to save a version of the images captured by the image sensor and the depth sensor for use in subsequent retraining of the deep neural network if the deep neural network is unable to recognize the detected object.

The controller may further comprise a cloud interface to communicate with the deep neural network over a network.

The sensor module may further comprise a human-input acquisition module configured to acquire the labeling information from a user in response to a request from the controller when the deep neural network is unable to recognize the detected object based on the submitted image data and estimated depth values.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Object-identification systems and methods described herein combine computer vision, machine learning, and a deep neural network (DNN) to enable the accurate identification and tracking of people and objects. Initially, the DNN may be a blank slate and incapable of object identification without human assistance or it can be trained with a predetermined set of images to give it a baseline. To give baseline object identification capabilities to the DNN, a human has to train the DNN with a predetermined training set of images. After its initial training, the DNN's ability to identify objects continuously improves because of subsequent trainings. These subsequent trainings are based on images in which the DNN could not initially identify an object. Objects in these images have become identifiable, and thus valuable for retraining the DNN, because of human-supplied information that identifies objects in the images or because of a multi-authentication process that focuses the DNN's detection efforts on a region in the images where change has been detected.

Figure 1:
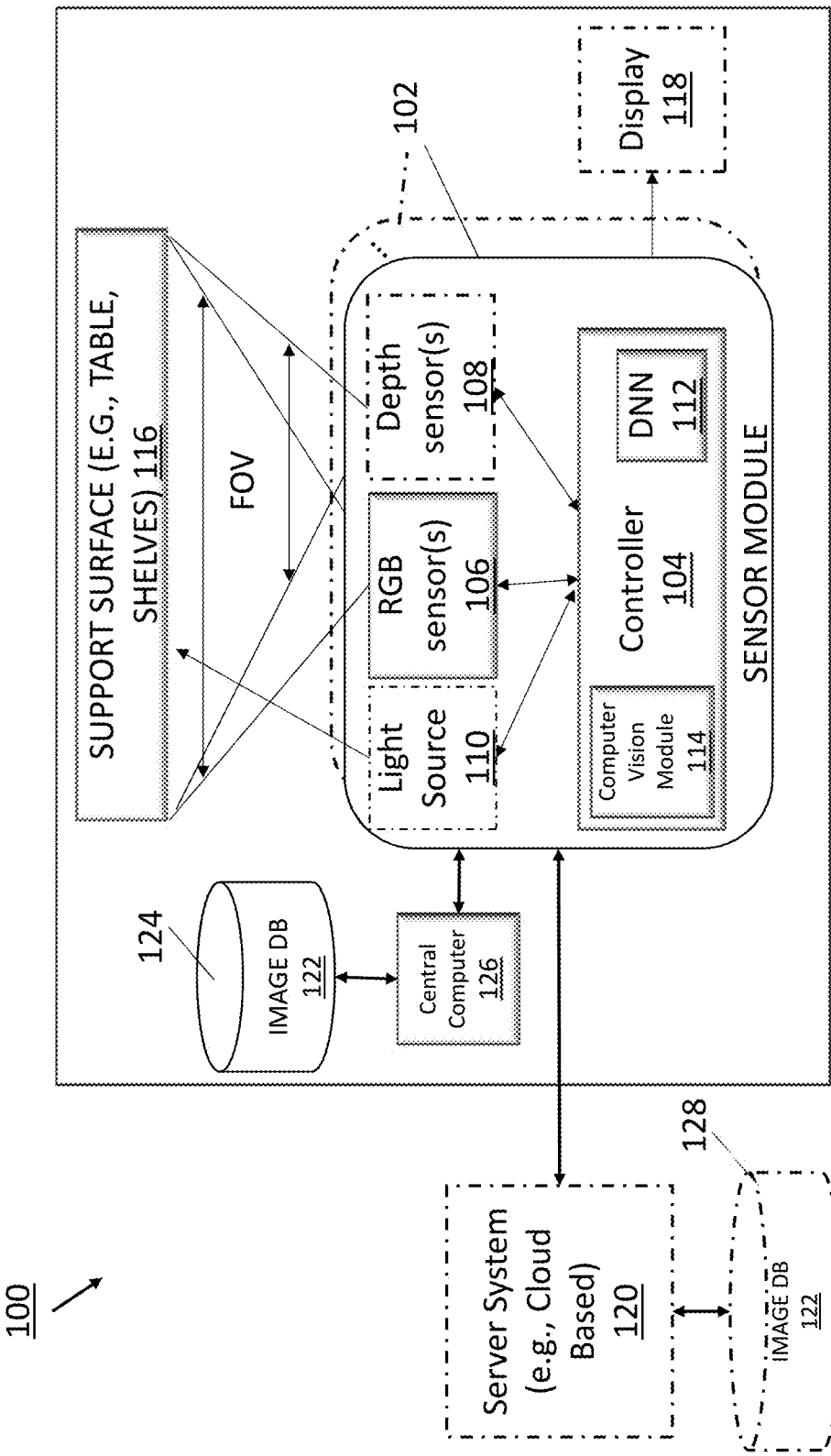
FIG. 1 shows an embodiment of a machine-learning-assisted object-identification system including a controller and an image sensor having a field of view of a support surface that is designated for holding objects.

FIG. 1 shows an embodiment of a machine-learning-assisted object-identification system 100 having at least one sensor module 102. Each sensor module 102 includes a controller 104 that is in communication with one or more color (e.g., RGB) image sensors 106, and, optionally, as shown in phantom, one or more depth sensors 108 and a light source 110, and, optionally, a wireless radio-frequency (RF) transceiver (not shown). The controller 104 implements a deep neural network (DNN) 112 for use in object recognition and a computer-vision module 114 for detecting changes in images, as described later in more detail.

In one embodiment, each sensor module 102 is a self-contained electronic unit capable of registering persons who visit the object-holding area, capturing images, image processing, detecting objects, machine-learning-assisted self-improving object recognition, object tracking, and, when so configured, providing light guidance. In other embodiments, one or more of these functions takes place remotely (i.e., not at the sensor module); for example, the functions of object detection, machine-learning-assisted self-improving object recognition, and object tracking can occur at a remote computing site with which the sensor module is in communication over a network.

The sensor module 102 may be deployed in a fixed position near a support surface 116 in an object-holding area, or it may be mobile, embodied in a mobile device. As an example of a fixed deployment, the sensor modules 102 may drop down from the ceilings in a surveillance configuration so that all corners of an enterprise site are covered. These sensor modules are small and non-intrusive and can track the identifications and paths of individuals through the enterprise, for example, as described in U.S. Pat. Pub. No. US-2018-0164112-A1, published Jun. 14, 2018, the entirety of which application is incorporated by reference herein.

Mobile embodiments of the sensor module include, but are not limited to, a smartphone, tablet computer, wearable computing device, or any other portable computing device configured with one or more processors, an RGB camera, wireless communication capabilities, an optional depth sensor, an optional light source, and software for performing the image processing, object detecting, tracking, and recognizing, self-improving machine learning, and optional light guidance functions described herein. The software can be embodied in a downloaded application (app) that can be stored on the mobile device. Being portable, a person or machine can, in effect, carry an object-identification device capable of recognizing objects captured by the camera(s) of the mobile device. For example, a person with such a device can run the software, approach a table (i.e., support surface) holding various objects, point the device (i.e., its camera(s)) at each object, capture an image of an object, and be told the type (identity) of the object. To obtain the identity of the object, the mobile device may communicate with a remote server that hosts the DNN, sending the image to the remote server, and receiving the identity of the object.

Each image sensor 106, which may also be referred to herein as an optical sensor, provides color information; each depth sensor 108 provides estimated depth for each pixel of a captured image. The image sensor 106 and depth sensor 108 may be embodied in a single camera, such as, for example, Microsoft's Kinect™, or be embodied in separate cameras. The image and optional depth sensors are disposed to face the support surface 116. Examples of the support surface include, but are not limited to, desktops. tables, shelves, and floor space. In general, the support surface is disposed in or at an object-holding area. The object-holding area can be, for example, a supermarket, warehouse, inventory, room, closet, hallway, cupboards, lockers, each with or without secured access. Examples of identified and tracked objects include, but are not limited to, packages, parcels, boxes, equipment, tools, food products, bottles, jars, and cans. (People may also be identified and tracked.) Each image sensor 106 has a field of view (FOV) that covers a portion of, or all the area occupied by the support surface 116; the field of view of an optional depth sensor matches at least that of an image sensor. Each separate sensor has its own perspective of the area and of the objects placed on the support surface 116.

The controller 104 may be configured to control the light source 110 to provide light guidance to objects located on the support surface 116 or to certain regions of the support surface, depending upon the object or region of interest. Examples of the light source 110 include, but are not limited to, lasers, projectors, LEDs, light bulbs, flashlights, and lights. The light source 110 may be disposed on or remote from and directed at the support surface 116.

A display 118 may be included in the object-identification system 100, to provide, for example, a visual layout of the objects on the support surface, visual guidance to objects or regions on the surface, and a user interface for use by persons who enter and leave the object-holding area. The display 118 may be conveniently located at the threshold of or within the holding area. The display 118 may be part of an electronic device (e.g., a computer, smartphone, mobile device) configured with input/output devices, for example, a physical or virtual keyboard, keypad, barcode scanner, microphone, camera, and may be used to register the identities of persons entering the object-holding area and/or to scan object labels.

The controller 104 may also be in communication with one or more servers 120 (i.e., server system) over a network connection. These server(s) 120 may perform third-party services, such as "cloud services," or be implemented locally or onsite at the enterprise. As used herein, the "cloud" refers to software and services that run on a remote network, such as the Internet, instead of at the sensor module or at a local computer. The cloud may be public, private, or a combination thereof. An example of cloud services suitable for the principles described herein is Azure™ cloud services provided by Microsoft® of Redmond, Wash. The server(s) 120 can run a virtual machine that provides the cloud services required by the sensor module 102.

During operation of the object-identification system 100, persons arrives at the object-holding area to perform any one or more of at least four object handling activities, including depositing an object, removing an object, moving an object to another spot in the holding area, or alerting personnel of an object warranting inspection. In general, the object-identification system registers the identities of persons who arrive at the holding area (i.e., who interact with the object-identification system) and associates each registered person with one or more objects that the person is handling. Using image processing techniques, the object-identification system continuously monitors and acquires real-time image data of the holding area. From the real-time image data, the object-identification system detects when each such object is placed on the support surface 116, moved to another region of the support surface, or removed from the support surface. Techniques for detecting and tracking objects disposed on a support surface in a holding area can be found in U.S. patent application Ser. No. 15/091,180, filed Apr. 5, 2016, titled "Package Tracking Systems and Methods," the entirety of which patent application is incorporated by reference herein. In addition, the object-identification system may identify a perishable item and send a notification to staff of its expiration. Or the object-identification system can recognize damaged goods on a shelf and notify staff accordingly. In response to the notifications, staff can then inspect the item in question to remove if past its expiration date or confirm the extent of damaged packaging.

The object-identification system further recognizes each object on the support surface or involved in a handling activity. Object recognition serves to identify the type of object detected and tracked (e.g., a package from a certain carrier, a jar of pickles, a microscope). Such object recognition may involve human interaction to initially identify or to confirm, correct, or fine tune the recognition of a given object. The object-identification system employs machine-learning techniques to improve its object recognition capabilities. Recognition of a given object can facilitate the tracking of the object while the object is in the holding area, serving to confirm the presence or movement of the object.

Upon occasion, the sensor module 102 will capture an image for which object recognition falls below a threshold, namely, the object-identification system is unable to recognize an object in the image. Despite being unable to recognize the object (at least initially), the object-identification system can still track the object, namely, its initial placement and any subsequent location within the holding area, based on visual characteristics of the object. The unidentifiable image is retained for purposes of later retraining of the DNN 112 so that the DNN will become able to recognize a previously unrecognizable object when that object is present in subsequently processed images. Human interaction with the object-identification system, through voice recognition, gesture recognition, or keyboard input, can specifically identify an object in an unidentifiable image, giving the image a proper label. An example of gesture recognition is a person holding up three fingers to identify the object as type number 3, where the object-identification system has stored the association of a three-finger gesture with a specific object (e.g., three fingers correspond to a microscope). After an object in the previously unidentifiable image becomes recognized, with the help of the human input, the image and associated proper label are stored in an image database 122. The object-identification system 100 uses these stored images and labels to retrain the deep neural network 112. By retraining the deep neural network with previously unidentifiable images, now made identifiable by human-provided information, the neural network 112 increasingly grows "smarter". Over time, the probability of the neural network recognizing objects in later captured images approaches one hundred percent.

The image database 122 may be kept in local storage 124, accessed through a central computer 126 in proximity of the sensor module 102. In this embodiment, the central computer 126 provides access to the image database 122 for all deployed sensor modules 102. In another embodiment, shown in phantom in FIG. 1, the image database 122 is stored in remote storage 128, for example, in "the cloud", with which each sensor module 102 is in communication through the server(s) 120. In addition to those initially unidentifiable images, the image database 122 also holds the initial training set of images.

Figure 2:
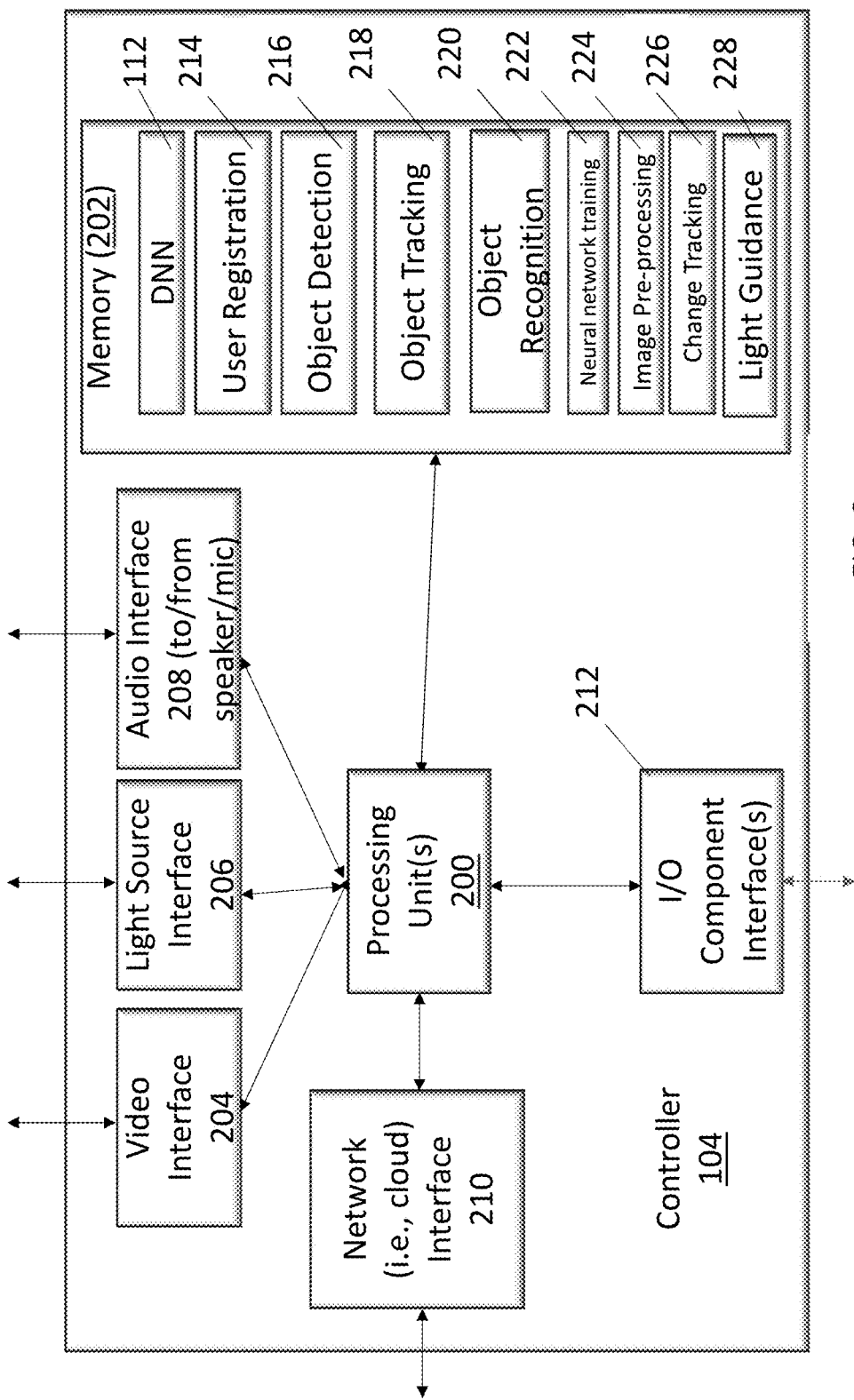
FIG. 2 is a block diagram of an embodiment of the controller of FIG. 1

FIG. 2 shows an embodiment of the controller 104 of FIG. 1. The controller 104 includes one or more processors 200, examples of which include, but are not limited to, image processors, central processing units, graphics processing units, each of standard or custom design. The one or more processors 200 are in communication with memory 202. In the instance of multiple processors 200, such processors may be located at different sites (e.g., one processor disposed locally (i.e., at the sensor module) and another disposed remotely (e.g., in "the cloud"). Similarly, the memory 202 can be disposed locally, remotely, or a combination thereof.

The one or more processors 200 are in communication with a video interface 204, an optional light source interface 206, an optional audio interface 208, a network interface 210, and interfaces 212 to I/O components (e.g., the display 118). By the video interface 204, the controller 104 communicates with each image sensor 106 and depth sensor 108, if any, in the sensor module 102; by the light source interface 206, the controller 104 controls activation of the light source 110, and, depending upon the type of light source, the direction in which to point an emitted light beam; by the audio interface 208, the controller 104 communicates with audio devices that capture or play sound.

In addition to conventional software, such as an operating system and input/output routines, the memory 202 stores program code for configuring the one or more processors 200 to implement the deep neural network (DNN) 112, and to perform personnel registration 214, object detection 216 in images, object tracking 218 in the holding area, object recognition 220 in images, neural network training 222, image-preprocessing 224, change tracking 226 in images, and, optionally, light guidance 228. The one or more processors 200 and memory 202 can be implemented together or individually, on a single or multiple integrated circuit (IC) devices. In addition, the program code stored in memory 202 can reside at different sites. For example, the program code for implementing the DNN 112 can reside at a remote location (e.g., on the cloud) while the program code for user recognition can reside and execute locally (i.e., on the sensor module).

In brief overview, the program code for personnel registration 214 records the identities and activities of individuals who use the object-identification system 100 and associates such individuals with the objects they affect; the program code for object detection 216 uses image-processing techniques to detect the presence of objects in images; the program code for object tracking 218 tracks the locations of detected objects within the holding area, the program code for object recognition 220 employs the DNN 112 to recognize (i.e., identify or classify) objects in images; the program code for neural network training 222 trains the DNN 112 to become capable of recognizing particular types of objects; the program code for image pre-processing 224 applies image editing techniques to captured images to improve object detection and recognition efforts in such images; the program code for change tracking 226 detects changes in images and assists in labeling images; and, optionally, the program code for light guidance 228 guides humans to objects and/or locations in the object-holding area using the light source 110. As later described in more detail, various elements or functionality of the controller 104 may reside remotely; that is, in some embodiments, some elements or functionality of the controller 104 are not part of the sensor module 102 (FIG. 1), but reside remotely (e.g., in "the cloud").

Figure 3:
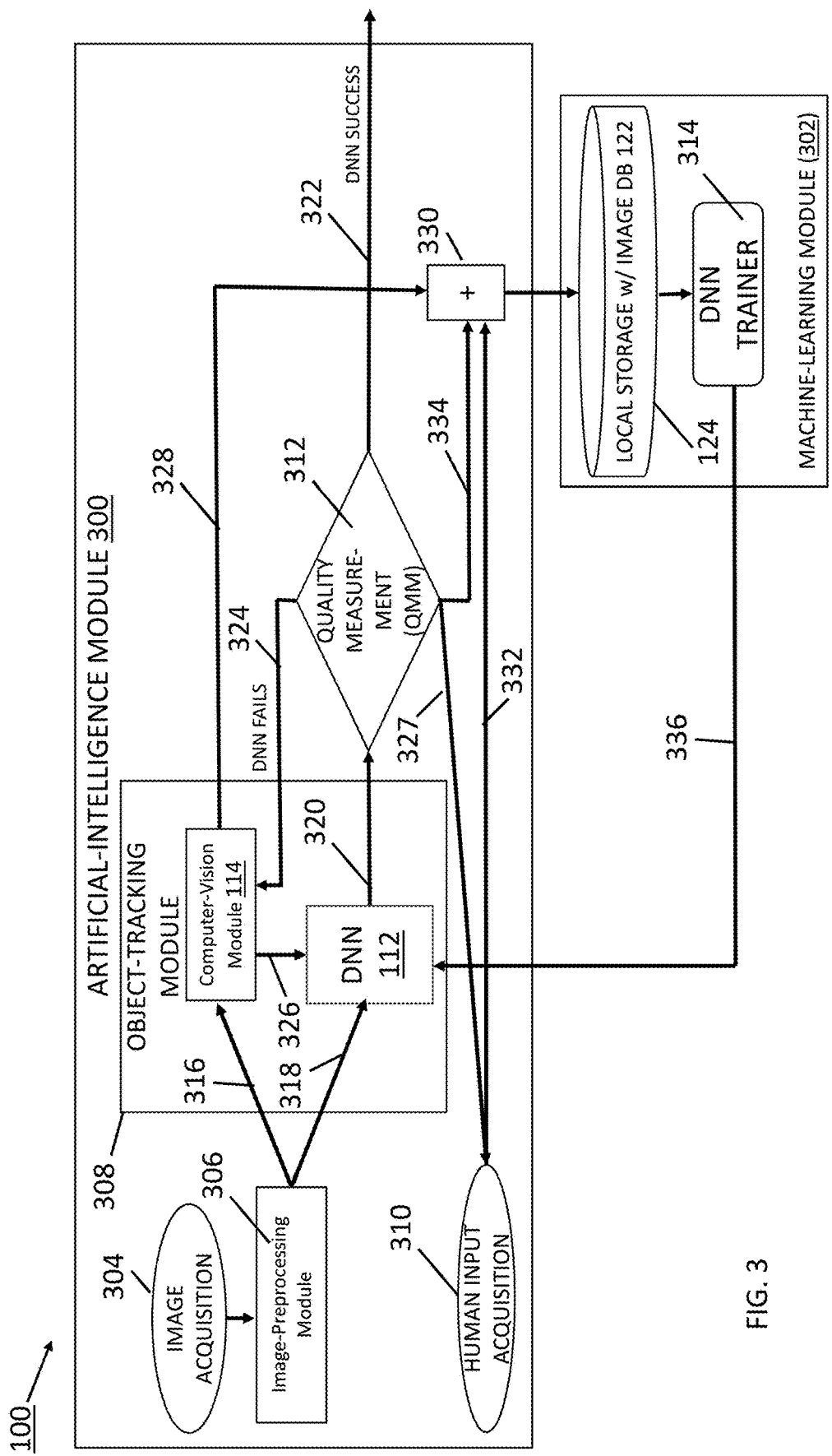
FIG. 3 is a functional block diagram of an embodiment of the machine-learning-assisted object-identification system including an artificial intelligence module in communication with a local machine-learning module.

FIG. 3 shows a functional block diagram of an embodiment of the object-identification system 100 including an artificial-intelligence (AI) module 300 in communication with a machine-learning module 302. The AI module 300 includes an image-acquisition module 304, an image-pre-processing module 306, an object-tracking module 308, a human-input-acquisition module 310, and tracking quality measurement module (QMM) 312. The machine-learning module 302 includes the local storage 124 (which maintains the image database 122, described in connection with FIG. 1) and a deep neural network (DNN) trainer 314.

The image acquisition-module 304 of the AI module 300 is configured to acquire images from the image sensor 106 and optional depth sensor 108. Captured images pass to the image-preprocessing module 306, and the image-preprocessing module 306 forwards the images to the object-tracking module 308. The image-preprocessing module 306 sends each image (line 316) to the computer-vision module 114 and copy of that image (line 318) to the DNN 112 (alternatively, the computer-vision module 114 receives the copy of the image.

In general, the object-tracking module 308 is configured to detect objects in images, to track such objects, and to perform object recognition using the DNN 112 of FIG. 1. The results (line 320) produced by the object-tracking module 308 pass to the tracking QMM 312, which uses thresholds (or other criteria) to establish whether an object has been recognized in an image. The results comprise two types of information: 1) the area in the image that the DNN deems to have found an object (or areas for multiple objects, depending on the image); and 2) a list of probabilities of each type of object considered to be in that area or areas.

Based on the information received from the object-tracking module 308, the QMM 312 determines whether the DNN 112 was successful identifying an object (or objects) in an image. If successful, the QMM 312 signals (line 322) success. The controller 104 can receive this success signal and respond to the signal accordingly, depending upon the end-user application that seeks to determine the identification of objects, such as a package-tracking application.

If an object is not identifiable within an image, the QMM 312 notifies (line 324) the computer-vision module 114. The computer-vision module 114 optionally sends an image (line 326) to the DNN 112; this image is derived from the original image and focuses on a region in the original image in which a change was detected. The DNN 112 may attempt to identify an object in this focused image (line 326), that is, the DNN 112 performs a second pass. If the DNN is unsuccessful during the second pass, the QMM 312 sends a request (line 327) to the human-input-acquisition module 310, seeking labeling information for the unidentifiable object in the original image. Irrespective of the success or failure of the DNN 112 to recognize an object in this focused image, the computer-vision module 114 sends (line 328) the original image within which an object was not initially recognized to the local storage 124. The image being stored is joined/associated (box 330) with a human-provided label (line 332) from the human-input-acquisition module 310 or with a label (line 334) produced by the DNN 112 (line 320), sent to the QMM 312, and then forwarded by the QMM 312. The DNN trainer 314 uses those images in the local storage 124 and their associated ID information (i.e., labels) to retrain (line 336) the DNN 112.

Each sensor module 102 (FIG. 1) can be configured to locally provide the functionality of the AI module 300, and the central computer 126 (FIG. 1) is configured to provide the functionality of the machine-learning module 302. Each sensor module 102 (FIG. 1) is in communication with the central computer 126, which provides the DNN training based on the images in the image database 122. Accordingly, different sensor modules will develop equivalent image recognition capabilities.

Figure 4:
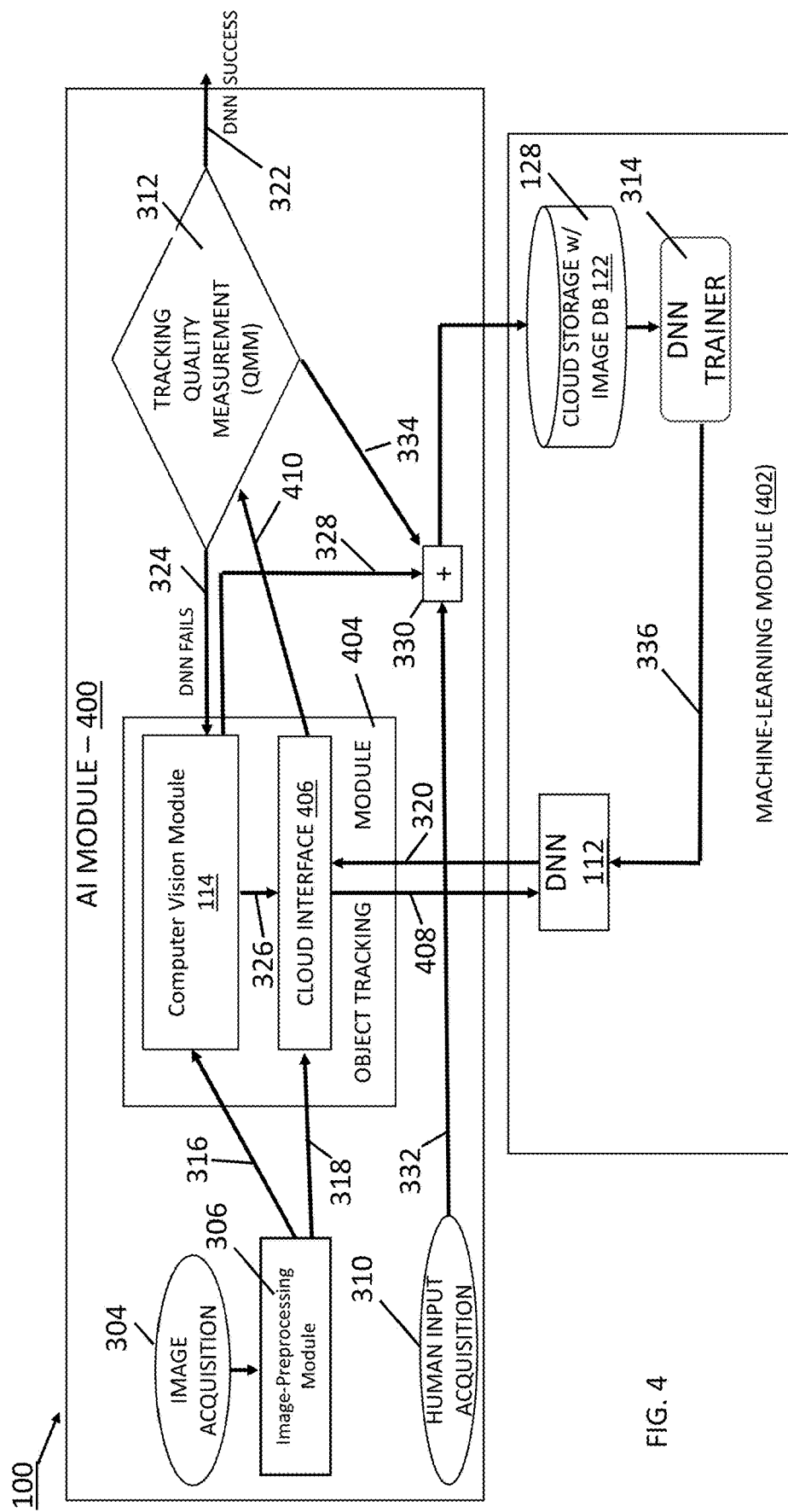
FIG. 4 is a functional block diagram of an embodiment of the machine-learning-assisted object-identification system including an artificial intelligence module in communication with a remote machine-learning module.

FIG. 4 shows a functional block diagram of another embodiment of the object-identification system 100 having an artificial intelligence (AI) module 400 in communication with a machine-learning module 402. In general, the object-identification system of FIG. 4 differs from that of FIG. 3 in that the machine-learning module 402 resides remotely, that is, on a network that is in the cloud or on the Internet. In addition, in this embodiment, the remote machine-learning module 402 includes the DNN 112. Accordingly, the DNN computations occur on a remote server (e.g., server 120 of FIG. 1), performed, for example, by third-party cloud services.

Specifically, the AI module 400 includes the image-acquisition module 304 (FIG. 3), an image-preprocessing module 306 (FIG. 3), an object-tracking module 404, the human-input-acquisition module 310 (FIG. 3), and the tracking QMM 312. The object-tracking module 404 includes the computer-vision module 114 and a cloud-interface module 406. The remote machine-learning module 402 maintains the image database 122 (FIG. 1) in cloud (i.e., remote) storage 128 and includes the DNN 112 and the DNN trainer 314 used to train and retrain (line 336) the DNN 112.

The computer-vision module 114, image-acquisition module 304, image-preprocessing module 306, object-tracking module 404, human-input-acquisition module 310, tracking QMM 312, cloud (i.e., remote) storage 128, DNN trainer 314, and DNN 112 operate like their counterpart modules in FIG. 3. A difference is that the AI module 400 uses its cloud-interface module 406 to transfer images, received from the image-acquisition module 304, over the network to the remote machine-learning module 402, to be used by the DNN 112 in its object detecting, tracking, and recognition algorithms. To the image-acquisition module 304 and the computer-vision module 114, the cloud-interface module 406 is effectively a "virtual DNN", that receives input from these two modules 304, 114 as though it were the DNN, and forwards such input (line 408) to the DNN 112 residing remotely. Accordingly, processor(s) on the remote server 120 perform the DNN computations. In addition, the machine-learning module 402 is configured to return the results (line 320) produced by the DNN 112 to the cloud-interface module 406 of the AI module 400. The cloud-interface module 406 forwards these results (line 410) to the QMM 312, which determines from the results whether the DNN 112 has recognized an object in the image.

If the QMM 312 determines the DNN 112 was successful identifying an object (or objects) in an image, the QMM 312 signals (line 322) success. If an object is not identifiable within an image, the QMM 312 notifies (line 324) the computer-vision module 114. The computer-vision module 114 optionally sends an image (line 326) to the cloud interface 414, for transmission to the remote DNN 112. This image is derived from the original image and is focused on a region in the original image in which the computer-vision module 114 detected change. The DNN 112 may attempt to identify an object in this focused image. If the DNN attempts but is unsuccessful during the second pass, the QMM 312 sends a request (not shown) to the human-input-acquisition module 310, seeking labeling information for the unidentifiable object in the original image.

Irrespective of the success or failure of the DNN 112 to recognize an object in this focused image during the DNN's second attempt, the computer-vision module 114 forwards (line 328) the original image (or an edited version of the original image) to the cloud storage 128. The image to be stored is joined or associated with (box 330) a human-provided label (line 332) acquired by the human-input-acquisition module 310 (in the event of a DNN failure) or with a label (line 320) produced by the DNN 112 on a successful second pass and forwarded by the QMM 312 (in the event of the DNN success). The DNN trainer 314 uses those images in the remote storage 128 and their associated ID information (i.e., labeling information) to retrain the DNN 112.

Each sensor module 102 (FIG. 1) can be configured to locally provide the functionality of the AI module 400, and the server system 120 (FIG. 1) is configured to provide the functionality of the machine-learning module 402. In this embodiment, all sensor modules 102 that are in communication with the remote machine-learning module 402 share the DNN 112 and image database 122 and contribute images for future re-training of the DNN 112. In general, by having access to the same image database 122 and DNN 112, all sensor modules will develop equivalent image recognition capabilities.

Figure 5:
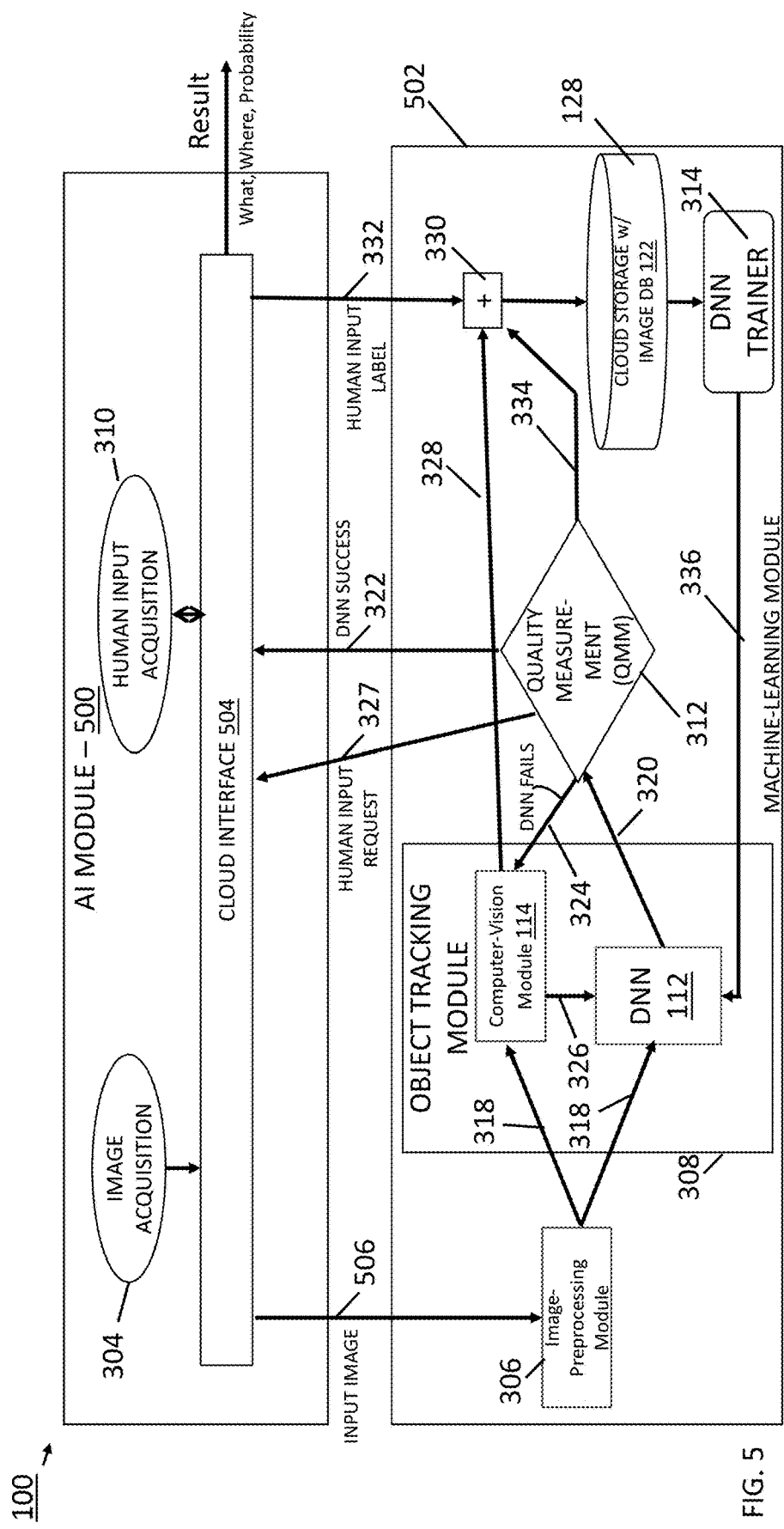
FIG. 5 is a functional block diagram of another embodiment of the machine-learning-assisted object-identification system including an artificial intelligence module in communication with a remote machine-learning module.

FIG. 5 shows a functional block diagram of another embodiment of the object-identification system 100 having an artificial intelligence (AI) module 500 in communication with a machine-learning module 502. Each sensor module 102 (FIG. 1) can be configured to locally provide the functionality of the AI module 500, and the server system 120 (FIG. 1) is configured to provide the functionality of the machine-learning module 502. In general, the object-identification system of FIG. 5 differs from that of FIG. 4 in that certain functionality of the AI module 400 in FIG. 4 occurs remotely. Specifically, the image-preprocessing module 306, the object-tracking module 308, and the QMM 312 are part of the remote machine-learning module 502, which also includes the DNN 112, remote storage 128, and DNN trainer 314. The AI module 500 includes a cloud interface 504, the image-acquisition module 304, and the human-input-acquisition module 310. The cloud interface 504 is in communication with the image-acquisition module 304 to forward (line 450) input images received therefrom to the remote image-preprocessing module 306. The cloud interface 504 also receives a successful result indicator along with results (line 322) from the remote QMM 312 when the DNN 112 is able to recognize one or more objects in the input image; the cloud interface 504 outputs the result for use by an application of the object-identification system 100.

If an object is not identifiable within an image, the QMM 312 signals (line 324) the computer-vision module 114. In response to the "DNN FAILS" signal, the computer-vision module 114 may send an image (line 326), derived from the original image (or an edited version of it) that is focused on a region in the original image in which the computer-vision module 114 detects a change, to the DNN 112 for an attempt to identify an object in this focused image, in effect, performing a second pass at authentication. The DNN 112 sends (line 320) the results of this second attempt to the QMM 312.

Irrespective of the success or failure of the DNN 112 to recognize an object in the focused image during the second attempt, the remote computer-vision module 114 forwards (line 328) the original image (or an edited version thereof), in which the DNN 112 was initially unable to recognize an object, to the cloud storage 128.

If an object is not identifiable within this focused image, the QMM 312 signals the AI module 500 (line 327), telling the AI module 500 to request human input. When the human-input-acquisition module 310 receives the human input, the cloud interface 504 sends (line 332) a human-input label to the cloud storage 128. Before being stored, the human input label (line 332) is combined or associated with (box 330) the image coming from the remote computer-vision module 114.

If an object is identifiable within the focused image, the QMM 312 sends a label (line 334) produced by the DNN 112 that is combined or associated with (box 330) the image sent to the cloud storage 128 by the computer-vision module 114. As previously described, the DNN trainer 314 uses those images and their associated labels in image database 122 maintained in the remote storage 128 to retrain (line 336) the DNN 112.

Figure 6:
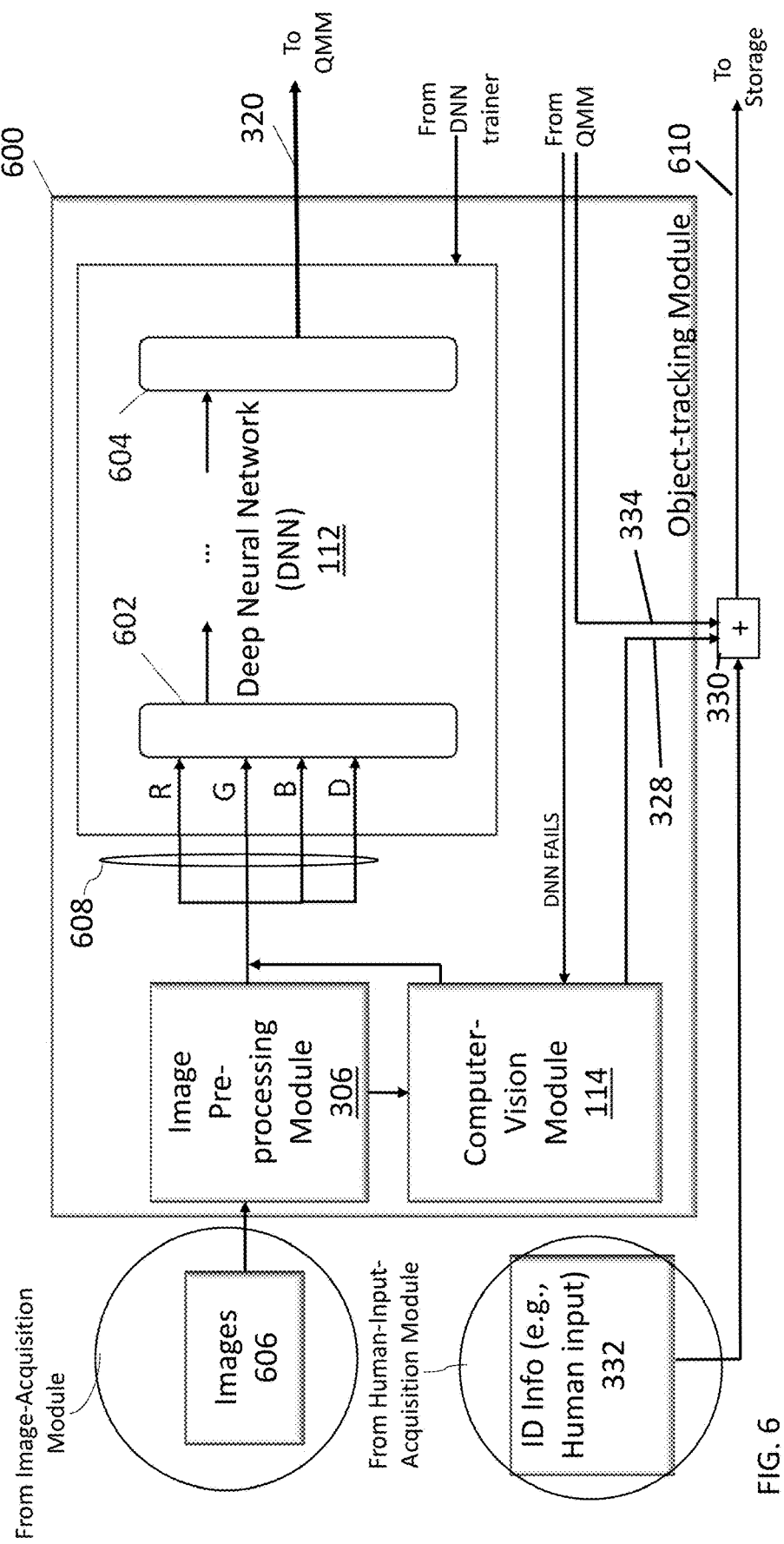
FIG. 6 is a block diagram of an embodiment of an object-tracking module including a deep neural network or DNN.

FIG. 6 shows an embodiment of an object-tracking module 600, including the image pre-processing module (or image preprocessor) 306 and the computer-vision module 114, for use in connection with the embodiments of object-identification systems described in FIG. 3 and FIG. 5. The object-tracking module 600 includes the DNN 112. In an embodiment where the DNN 112 is remote with respect to the object-tracking module, such as in FIG. 4, the object-tracking module 600 has a cloud-interface module 406 (FIG. 4) that operates as a virtual DNN and communicates with the actual DNN.

In one embodiment, the DNN 112 has a deep learning architecture, for example, a deep convolutional neural network, having an input layer 602, an output layer 604, and multiple hidden layers (not shown). Hidden layers may comprise one or more convolutional layers, one or more fully connected layers, and one or more max pooling layers. Each convolutional and fully connected layer receives inputs from its preceding layer and applies a transformation to these inputs based on current parameter values for that layer. Example architectures upon which to implement a deep learning neural network include, but are not limited to, the Darknet Open source Deep Neural Net framework available at the website pjreddie.com and the Caffe framework available at the website caffe.berkeleyvision.org.

The DNN 112 is involved in two processes: object detection/recognition and training. For purposes of object detection and recognition, images 606 are provided as input 608 to the DNN 112 from the image-acquisition module. The images 606 include color images (e.g., RGB) and, optionally, depth images. Color and depth images captured at a given instant in real-time are linked as a pair. Such images may pass through the image preprocessor 306, which produces image data 608 based on the processed images. The image preprocessor 306 may or may not modify an image before the image 606 passes to the DNN. In one embodiment, the image preprocessor 306 is configured to apply one or more image-editing techniques determined to enhance the DNN's ability to detect objects in images by making such images robust (i.e., invariant) to illumination changes. For RGB, one pre-processing algorithm uses a series of steps to counter the effects of illumination variation, local shadowing, and highlights. Steps in the algorithm include gamma correction, difference of Gaussian filtering, masking and contrast equalization. Depth data can be noisy and can have missing data depending on the circumstances under which depth data are captured. Ambient light and highly reflective surfaces are major factors of noise and missing data. This pre-filtering ensures that these artifacts are corrected for and that the data are well preserved. Pre-processing steps include ambient light filtering, edge-preserving smoothing, Gaussian blurring, and time-variant blurring. When depth images and RGB images both pass to the image preprocessor 306, the image preprocessor performs a blending transformation process that blends the RGB data with the depth data to produce image data 608. Examples of blending transformation processes include, but are not limited to, blending by concatenation or blending by interleaving, both of which are described in more detail below.

The image data 608 passes to the input layer 602 of the DNN 112. (Though not shown in FIG. 6, any label information obtained by human interaction also passes to the input layer 602 for training, object recognition, or both). Both the image preprocessor 306 and the computer-vision module 114 are configured to provide image data 608 to the DNN 112. The image data 608 includes pixel values for each of RGB (Red, Green, Blue) acquired from the color images and, optionally, for D (Depth) taken from depth images. FIG. 6 illustrates blending by concatenation, wherein each color and pixel value has its own channel, and the RGB image is blended with the depth image by concatenating the channels. In those embodiments where D values are submitted, less than all color values R, G, or B, may be submitted. For example, R+D, G+D, B+D, R+G+D, R+B+D, G+B+D are instances of where less than all three color (RGB) values are submitted as input together with the D value, each submitted value having its own channel.

Alternatively, blending by interleaving can blend the RGB image with the depth image. In this blending technique, instead of concatenating the RGB and depth images and gaining channels, the channels of both images are blended in a manner that retains the original structure, that is, the number of channels in the resulting image do not increase after blending from the number of channels in the original RGB image. One such example follows:

Consider an eight-bit three-channel RGB image, that is, the R-channel has eight bits, the G-channel has eight bits, and the B-channel has eight bits. Further, consider that the depth image is a single channel of 16-bit data; that is the D-channel has 16 bits.

One method of combining data from multiple dimensions (i.e., channels) and packing the data into fewer dimensions (i.e., channels) is the Morton Number Interleaving.

For example, a color pixel value [R, G, B] of [255, 125, 0] has an eight-bit binary representation of [11111111, 01111101, 00000000], where the three eight-bit values represent the three eight-bit R, G, and B channels, respectively.

For the 16-bit depth value, three eight-bit values are derived. The first eight-bit value, referred to as D1, entails a conversion of the 16-bit value to an eight-bit value. This conversion is done by normalizing the decimal equivalent of the 16-bit depth value and multiplying the normalized value by the maximum value of an eight-bit number (i.e., 255). For example, consider an original 16-bit depth value [D] that has a decimal value of [1465]. Normalizing the decimal value [1465] entails dividing this decimal value by the maximum decimal value that can be represented by 16 bits, namely [65025]. Accordingly, the multiplied, normalized decimal value for D1=(1465/65025)*255=6 (rounded up). The eight-bit binary representation of D1 is [00000110].

The next two bytes are obtained by partitioning the original 16-bit depth value [D] into two eight-bit bytes, called D2 and D3. For example, the previously noted 16-bit depth value [D] of [1465] has a binary representation of [0000010110111001]. The 8-bit D2 byte corresponds to the first byte of the 16-bit depth value [D], which is [00000101], and the 8-bit D3 byte corresponds to the second byte of the 16-bit depth value [D], which is [10111001]. Accordingly, [D2, D3]=[00000101, 10111001].

The three bytes [D1, D2, D3] derived from the original depth value [D] are [00000110, 00000101, 10111001]. As previously mentioned, the three-channel, eight-bit RGB values are [11111111, 01111101, 00000000].

Morton order interleaving produces a 16-bit, three-channel image from the three channels of depth values bytes [D1, D2, D3] and the three channels of RGB values [R, G, B] bytes by appending the depth values to the RGB values as such: [RD1, GD2, BD3]. With regards to the previous example, the Morton order interleaving produces three 16-bit channels of [1111111100000110, 0111110100000101, 0000000010111001]. The technique executes for each pixel of the corresponding images 606 (i.e., RGB image and its associated depth image). The result is a three-channel image that has both depth and color information. It is to be understood that Morton order interleaving is just an example of a technique for interleaving depth data with color data for a given pixel; other interleaving techniques may be employed without departing from the principles described herein.

As with the blending by concatenation technique, less than all color values R, G, or B, may be interleaved with a depth value. For example, R+D, G+D, B+D, R+G+D, R+B+D, G+B+D are instances of where less than all three color (RGB) values are submitted as input together with a D value. In these cases, there is a separate channel for each interleave of color and depth. When less than three RGB channels are used, any of the D1, D2, D3 depth channels can serve for interleaving. For example, the combinations such as R+D, G+D, and B+D each require only one channel; combinations such as R+G+D, R+B+D, G+B+D each have two channels. If only one RGB channel is used, D1 is the preferred choice, because the D1 depth channel contains the whole depth information. If two color channels are used, then two depth channels are used in the interleaving: for example, D2 and D3 (D2 and D3 together have the whole depth information). To illustrate, again using the color pixel value [R, G, B] of [255, 125, 0] and the original depth value of [1465], the combination of R+G+D produces the following 16-bit two channel [RD2, GD3] input data: [1111111100000110, 0111110100000101]], where D2 and D3 are the chosen depth channels. In general, the ability to achieve object detection benefits from having more information available rather than less; accordingly, blending by concatenation, which retains all of the available color and potentially depth data, may produce better detection outcomes than blending by interleaving, which reduces the number of channels and may use less than all color and depth. Where blending by interleaving may be more advantageous over blending by concatenation is when it comes to training speed.

The output layer 604 produces an output 320 that passes to the QMM, which may be by way of a cloud interface 406 (FIG. 4). The output 320 can include a label for an object detected in the image-under-analysis, an indication of where the object is located in the image, and a value representing the probability (i.e., level of confidence) of an accurate recognition.

The DNN 112 is also in communication with the DNN trainer for purposes of receiving parameter value updates used in retraining.

In one embodiment, the DNN 112 is comprised of two deep neural networks (not shown) that operate in parallel. One neural network receives the R, G, and B pixel values, while the other receives the R, G, B, and D values. Each neural network attempts to recognize one or more objects in the supplied image based on the image data 608 submitted. Each produces an output. The two outputs can be compared and/or combined, for purposes of confirming and/or augmenting each other's determination. For example, consider that the RGB neural network produces a result of having detected one package in a specific area of the image and the RGBD neural network produces a result having detected two packages in the same specific area. A comparison of the probabilities of the two neural networks (and a logic circuit) would declare resolve the difference and finalize the result as either one package or two.

The computer-vision module 114 is in communication with the QMM to receive a "DNN FAILS" signal in the event the DNN 112 fails to successfully recognize an object in the image. Upon receiving such a signal, the computer-vision module 114 outputs (line 328) an image corresponding to the original image in which the DNN could not identify an object. This image can become associated with labeling information 332 supplied by a human (e.g., in response to a prompt from the AI module when the DNN's object identification fails). This combination 610 of labeling information and image passes to storage, where it becomes part of the image database 122. Alternatively, the combination 610 includes the image and labeling information coming (line 334) from the QMM 312 (produced by the DNN 112) when the DNN successfully identifies an object during the second pass.

Figure 7:
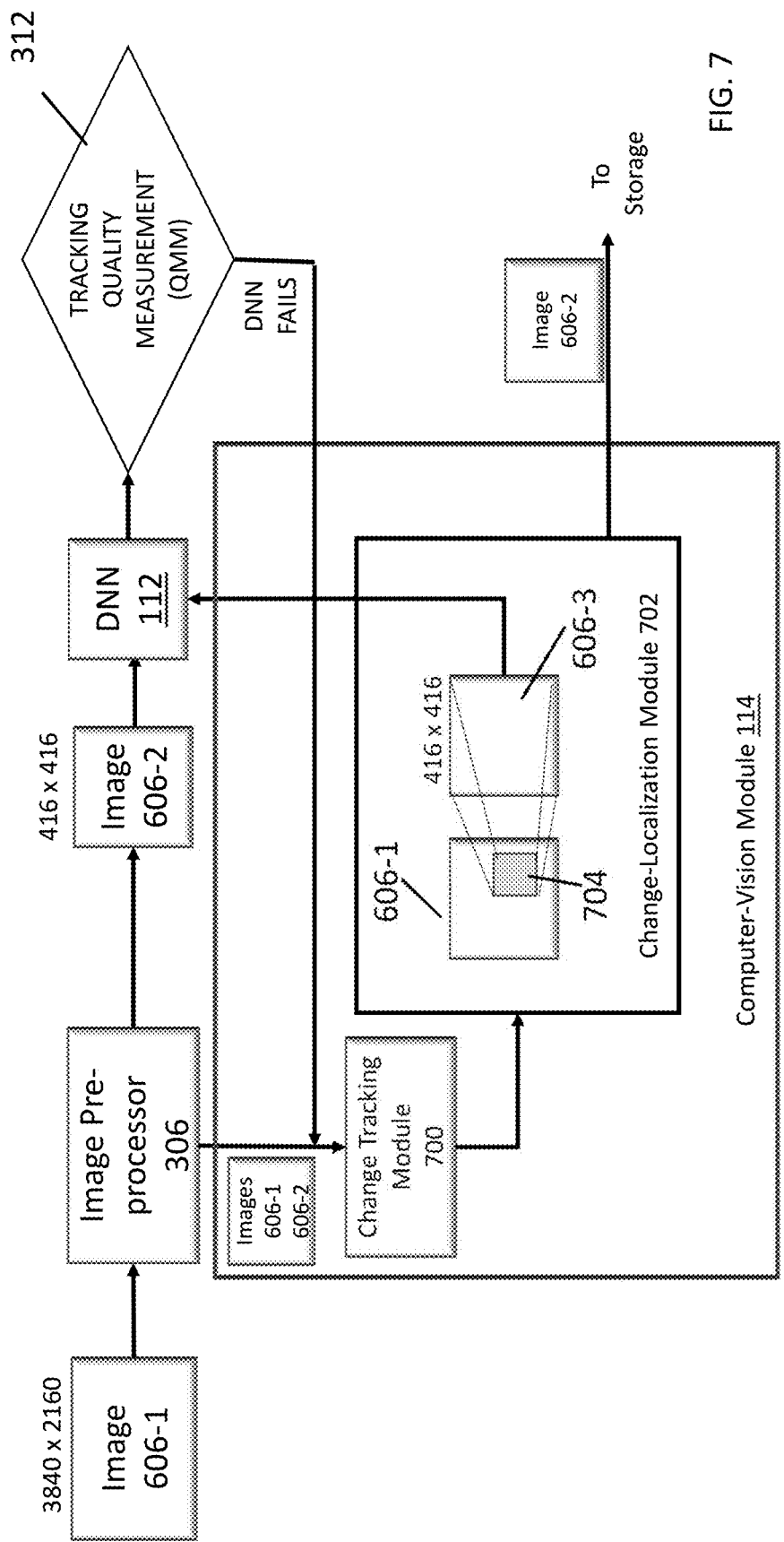
FIG. 7 is a block diagram of an embodiment of the computer-vision module.

FIG. 7 shows an embodiment of the computer-vision module 114. In general, the image-acquisition module can capture an image that has a higher resolution that what the DNN 112 needs as an input. For example, the image-acquisition module can acquire an image 606-1 that is 3840×2160 pixels, whereas the DNN 112 requires an image of 416×416 pixels (e.g., when based on a required calculation speed). Accordingly, the image-preprocessing module 306 down-samples the original image 606-1 to produce a resized image 606-2 that matches the input resolution of the DNN 112. The DNN 112 attempts to detect an object or objects in the resized image 606-2 and sends the results to the QMM 312. The QMM determines from the results whether the DNN 112 has successfully detected one or more objects in the image.

In addition, the image-preprocessing module 306 sends the original image 606-1 and the resized image 606-2 to the computer-vision module 114. The computer-vision module 114 includes a change-tracking module 700 in communication with a change-localization module 702. In one embodiment, the computer-vision module 114 performs a multi-pass authentication process when the DNN 112 fails to detect an object in the image 606-2. In the event of an unsuccessful object detection, the QMM signals the change-tracking module 700, which, in response, executes the change-tracking program code 226 (FIG. 2) to identify an area 704 in the original image 606-1 in which a change appears (with respect to an earlier captured image).

The change-localization module 702 uses this information to produce an image 606-3 that focuses on the region 704 in the original image with the detected change. The focused image 606-3 has a resolution that matches the input resolution of the DNN 112. In order to attain this resolution, the change-localization module 702 may have to reduce or enlarge the size of the region 704 of change. The focused image 606-3 passes to the DNN 112, which attempts to detect an object in this image. The computer-vision module 114 sends the resized image 606-2 to the storage (local or remote) and marks the boundaries of the focus region 704 as those boundaries translate to the resized image 606-2. The boundary information includes a row, column, height, and width of the pertinent region within the resized image 606-2.

Within the storage, the resized image 606-2 is associated with the label name provided by human input (when the DNN fails to recognize an object in the focused image 606-3) or with the label produced by the DNN 112 (when the DNN successfully recognizes an object in the focused image 606-3). The resized image 606-2, the marked boundaries, and label information are used together in subsequent retraining of the DNN 112.

Figure 8:
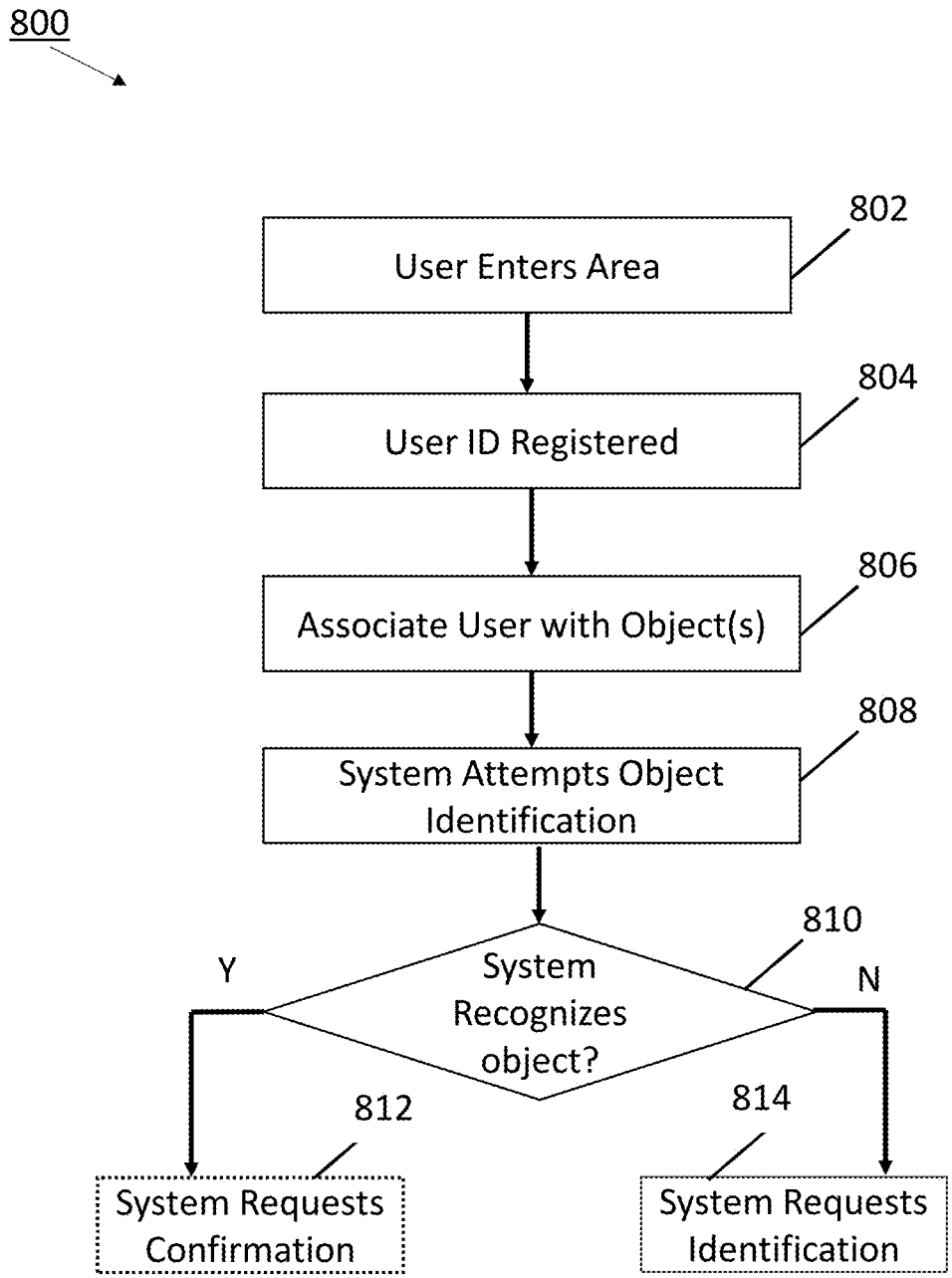
FIG. 8 is a flow chart of an embodiment of a process for machine-learning-assisted object identification.

FIG. 8 shows an embodiment of a process 800 for object tracking in accordance with the principles described herein. A person enters (step 802) an area designated for holding objects. Such an area can be, for example, a room for storing packages or a shelf holding boxes of cereal or jars of mayonnaise.

The object-identification system 100 registers (step 804) an identification of the person. The registration can occur automatically, that is, without the person's conscious involvement. For example, a sensor module 102 can wirelessly communicate with a device carried by the person, such as, for example, a key fob or a smartphone. Alternatively, the controller 104 can perform facial recognition. As other examples of techniques for obtaining the person's identification, the person can deliberately identify him or herself, such as offering a name tag for scanning, entering a PIN code or password, submitting biometric information (e.g., a fingerprint or retinal scan), speaking to allow for voice recognition. In another embodiment, the object-identification system 100 identifies the individual using skeletal tracking (i.e., the skeletal structure of the individual) and registers the skeletal structure. In addition to registering the person, the object-identification system 100 can record the person's time of arrival at the holding area.

At step 806, the object-identification system 100 associates the person with one or more objects in the holding area. The association can occur directly, from user input, or indirectly, based on an activity performed by the user and observed by the system. As an example of direct association, the system can expressly request that the person provide information about the purpose of the visit, such as depositing or removing an object, and the identity of each object the purpose involves. The person can provide this information through any number of input techniques, for example, scanning the label on a package to be deposited. Alternatively, the person can identify what the object is by typing in the name of the object or by speaking to the system, which uses voice recognition and speech-to-text conversion techniques. After receiving the information about each affected object, the system associates that object with the identity of the registered person.

As an example of indirect association, the object-identification system 100 can detect the activity performed by the person in the holding area. For example, through image processing, the system can detect that an object has been placed on or removed from a shelf and then associate the newly placed object, or the removed object, with the identity of the registered person.

At step 808, the object-identification system 100 attempts to recognize what the object is. Recognition may result from information supplied directly to the system by the user, for example, when the user enters that the "item is a microscope"; from a previous determination, for example, the system detects the removal of an object with an already known identity; or from object recognition, for example, the system executes its object recognition algorithm upon an image of the newly detected object. In one embodiment, the system automatically requests human interaction, namely, to ask the human to identify an object being deposited, moved, or removed. Such request can occur before, during, or after the system attempts its own object recognition.

A decision to request human interaction may be based on a threshold value derived by the controller 104 in its attempt at object recognition from a captured image. For example, if, at step 810, the threshold value exceeds a first (e.g., upper) threshold, the system considers an object to have been recognized with a high degree of confidence and may dispense with human interaction; if the threshold value is less than the first threshold but greater than a second (e.g., lower) threshold, the system considers an object to have been recognized, but with a moderate degree of confidence; if the threshold value falls below the second threshold, the system concludes it has not recognized any object in the image. The system may request that the person confirm or correct (step 812) the system's identification if the determined threshold value is below the upper threshold, but above the lower threshold, and request (step 814) that the person provide the identification if the determined threshold value is below the lower threshold. Fewer or more than two thresholds may be used without departing from the principles described herein. Further, the system may request confirmation even if the threshold value exceeds the upper threshold or request the object's identity in the event of an imprecise, incorrect, or unsuccessful object recognition.

The activity of the person in the holding area may change the layout of objects on the support surface. A new object has been placed, an object has been removed, an object has been moved to another location, or any combination thereof. The new arrangement of the objects produces different perspectives and varied angular irregularities in relation to the image and depth sensors of one or more sensor modules. Machine learning not only learns what an object looks like through both color and depth, it can now learn various perspectives on each object as they are placed in different locations in the area. This machine learning compensates for the dynamic perspectives of objects, seen by the image sensor, and learns how an identified object can be the same object if placed in different areas within the viewing area and at different angles, depths in the shelving. Accordingly, images now captured by the image sensors provide an opportunity to improve object recognition, through machine learning techniques. The system retrains the neural network with those newly captured images for which the neural network was unable to identify the object (at least initially) and needed the labeling information about the object provided by the user or by the neural network during a multi-pass authentication. The system can also record the person's time of departure when the person leaves the holding area, and then associate the person's time of arrival and time of departure with the object.

Consider the following illustrations as examples of operation of one embodiment of the object-identification system 100. Alice enters a room having several shelves. She is carrying a microscope and a smartphone. The smartphone is running Bluetooth®. The controller 104 connects to and communicates with the smartphone to establish the identity of the person as Alice. In addition, the controller establishes the time of Alice's entry into the room, for example, as 1:42 p.m., Thursday, Apr. 16, 2019. Alice places the microscope on one of the shelves. Through image processing of images captured by the image sensor, the controller detects the object and location of the microscope. In addition, the controller may employ machine learning to recognize the object as a microscope. The controller may ask Alice to confirm its determination, whether the controller has recognized the object correctly or not. If the controller was unable to recognize the placed object, the controller may ask Alice to identify the object, which she may input electronically or verbally, depending upon the configuration of the object-identification system. Alternatively, the system may be configured to ask Alice the identity of the object, irrespective of its own recognition of the object. The system can then, locally or remotely on the server, immediately, or later, train its neural network with the images captured of the microscope and with the information, if any, provided by Alice. Alice then departs the room, and the controller records the time of departure as 1:48 p.m., Thursday, Apr. 16, 2019.

Bob enters the room and submits his identification to the controller using a PIN code. The controller registers Bob and his time of entry as, for example, as 2:54 p.m., Thursday, Apr. 16, 2019. The controller identifies Bob and, from his pattern of past practices, recognizes his regular use of the microscope. The controller asks, audibly or by a message displayed on a display screen, if Bob is looking for the microscope. If Bob answers in the affirmative, the controller illuminates the light source and directs a light beam at the location on the shelves where the microscope resides. Bob removes the microscope from the shelf and departs the room with it. The system records Bob's time of departure as 2:56 p.m., Thursday, Apr. 16, 2019, and that Bob has taken the microscope. By linking the arrival of the microscope with Alice, the removal of the microscope with Bob, the times of such operations, the presence of the microscope in the interim, all confirmed by video recordings, the system has thus established a chain of custody of the microscope. This chain of custody principle can extend to other fields of endeavor, such as processes for handling evidence. In the present context, chain of custody means a chronological recording of the sequence of custody (possession) and locations of physical objects coming into, moving within, and going out of the holding area. The object-identification system knows who has brought certain pieces of evidence into the evidence room, taken evidence from the room, and the precise locations of the evidence within the room in the interim, even if moved to another section within sight of the image sensor.

Figure 9:
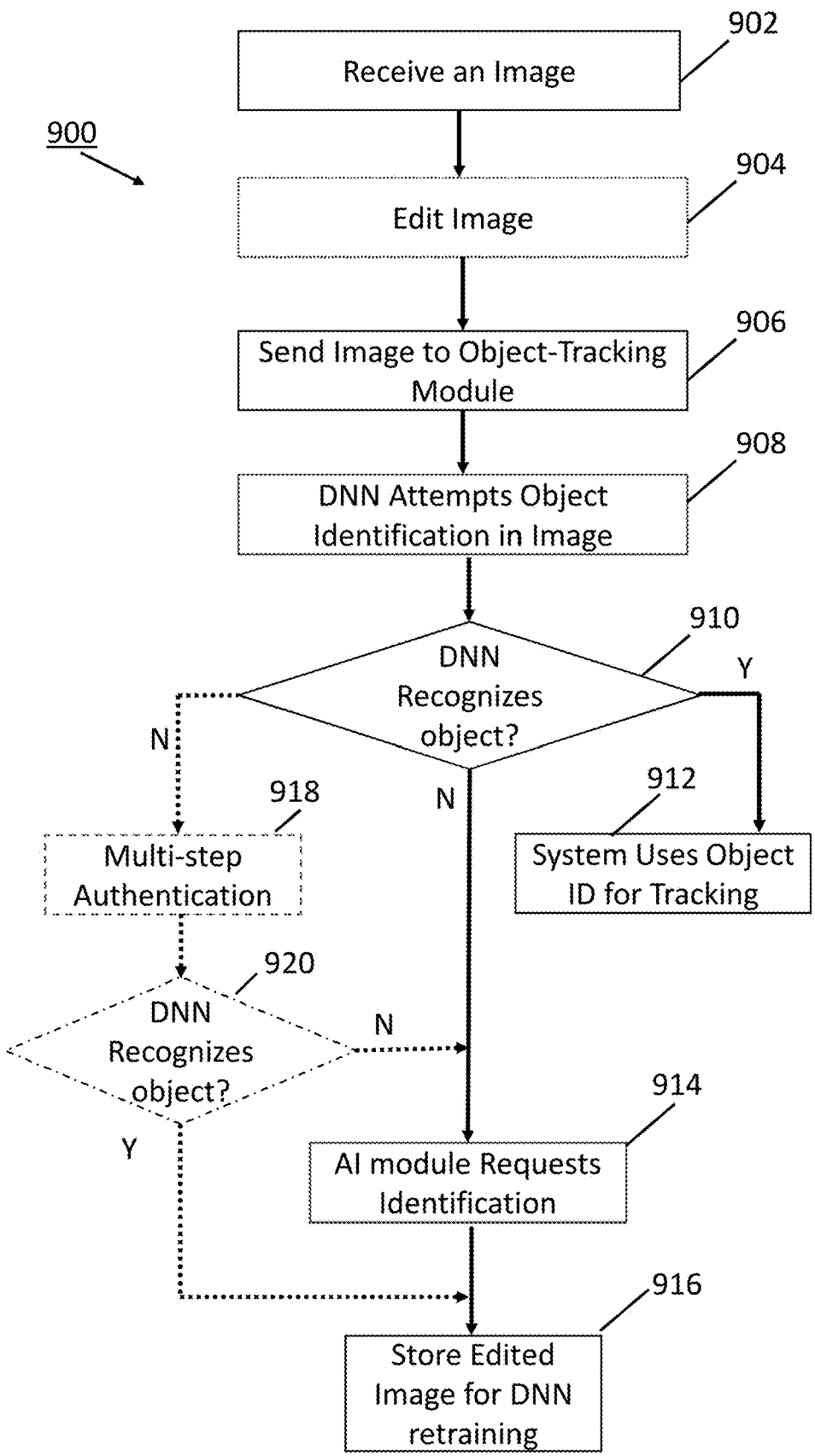
FIG. 9 is a flow chart of an embodiment of a process for identifying an object in a captured image and an optional multi-pass authentication process.

FIG. 9 shows an embodiment of a process 900 for recognizing objects in images. At step 902, the image-acquisition module 304 receives a captured image. Optionally, the image preprocessing module 305 edits (step 904) the image, including lowering its resolution, before sending (step 906) the image to the DNN 112. The DNN attempts to detect and identify (step 908) an object in the received image.

If the QMM 312 determines (step 910) that the DNN successfully identified one or more objects in the image, the object-identification system 100 uses (step 912) the information about each identified object, for example, for object-tracking purposes. The specific use of the object information depends upon the application for which the object-identification system is being used.

If, instead, the QMM determines (step 910) that the DNN was unsuccessful in the attempt to identify an object in the image, the AI module asks (step 914) the human to identify the object. After the human supplies the requested information, the optionally preprocessed image (produced in step 904) is stored (step 916) in the image database 122 with the human-provided labeling information, for later use in retraining the DNN.

In one embodiment, shown in phantom in FIG. 9, the AI module performs (step 918) the multi-pass authentication process described in connection with FIG. 7. If, at step 920, the DNN is unable to identify an object in the second pass, the AI module asks (step 914) the human to identify the object, and the optionally preprocessed image is stored (step 916) in the image database 122 with the human-provided labeling information. Alternatively, if, at step 920, the DNN successfully identified an object in the image on the second attempt, the optionally preprocessed image is stored (step 916) with DNN-provided labeling information for later use in retraining the DNN. Accordingly, when the DNN can identify an object on the second pass, the image is saved with the identifying label produced by the DNN; when the DNN is unable to identify an object on the second attempt, the image is stored with the human-supplied label information.

Figure 10:
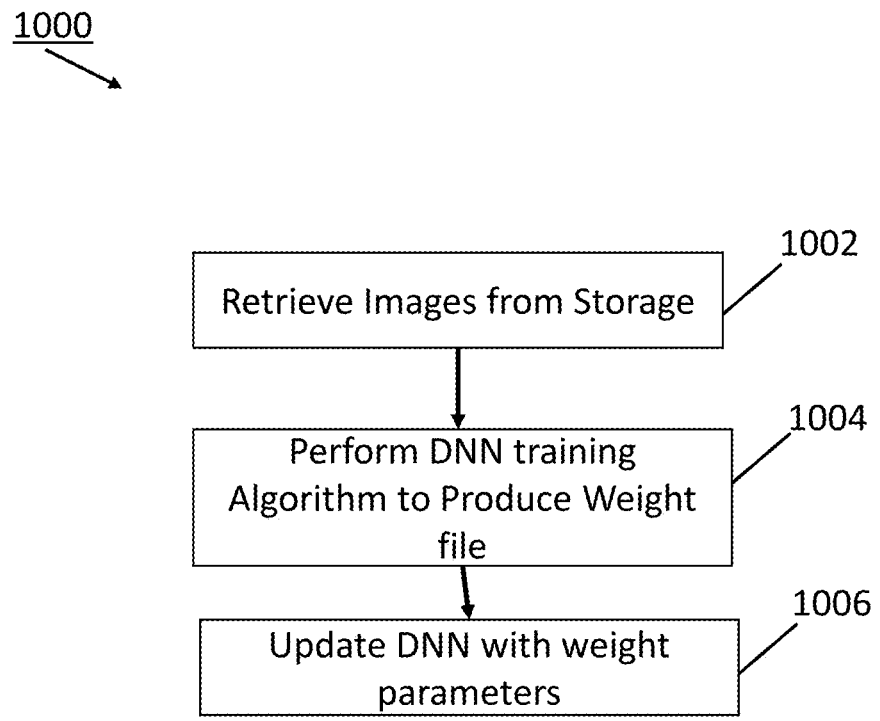
FIG. 10 is a flow chart of an embodiment of a process for retraining the DNN with images in which the DNN does not initially identify an object.

FIG. 10 shows an embodiment of a process 1000 for retraining the DNN with images in which the DNN does not initially identify an object. Periodically, the object-identification system 100 determines that the DNN is to be retrained with images stored in the image database. Such retraining can be based on a schedule (e.g., every evening, every week, etc.).

For purposes of retraining the DNN 112 (FIG. 1), the DNN trainer 314 (e.g., FIG. 3) retrieves (step 1002) the images in the image database 122. Such images are stored in local storage 124 or remote storage 128. The image database 122 contains the initial training set of images and each image in which the DNN 112 was initially unable to identify an object.

Based on the images in the image database, the DNN trainer 314 runs program code for neural network training 222 (FIG. 2) that produces (step 1004) a new neural network weight file. The new weight file contains a weighting (i.e., parameter) value for each of the "neurons" of the DNN 112. To update the DNN, that is, to retrain the DNN, the DNN trainer sends this new weight file to the DNN, to be applied by the DNN to its neuron structure for object detection and recognition in subsequently received images.

In general, the DNN trainer maintains a copy of the current weight file for the DNN. The retraining of the DNN can occur in whole or in part. When retraining in whole, the entire DNN is trained from scratch, that is, the current weight file is erased and replaced with a newly generated weight file. It's as though the DNN was again a blank slate and was being initially trained. This retraining uses the initial training set of images and each additional image added to the image database for not being initially identified.

When retraining in part, the retraining can focus on certain layers of the DNN. For example, consider a DNN with ten hidden layers; retraining can be performed on the seventh, eighth, and ninth hidden layers only, the operative principle being to avoid performing a full DNN training, which can be time consuming, when a focused retraining can suffice. In this example, only those parameter values in the current weight file that are associated with the neurons of the seventh, eighth, and ninth hidden layers are changed. The new weight file, produced by the DNN trainer and sent to the DNN, is a mix of the new parameter values for the neurons of the seventh, eighth, and ninth hidden layers and old parameter values for the remainder of the DNN.

Consider that, as an example of the machine learning in operation, Alice places a microscope on a shelf. At the time of registering Alice, if the object-identification system 100 does not recognize the object, the system asks Alice to identify the placed object; she may respond that the object is a microscope. The object-identification system 100 further captures one or more images of the object on the shelf and associates each captured image with the information provided by Alice (i.e., the object is a microscope). The DNN trainer uses each captured image and the information provided by Alice to train the neural network 112. This training may be the system's initial training for identifying microscopes, or cumulative to the system's present capability. In either case, after the training, the object-identification system is better suited for identifying microscopes.

Although described with respect to detecting, tracking, and recognizing objects, the machine-learning techniques described herein extend to the detecting, tracking, and recognizing faces, skeletal structure, body position, and movement of people in the captured images. In similar fashion as images of objects are used to train the deep neural networks to improve object recognition, images of faces can be used to train such networks to improve facial recognition for purposes of user registration, and images of skeletal features, such as hands, arms, and legs can be used to train such networks to improve for purposes of identifying and tracking individual persons and objects.

As will be appreciated by one skilled in the art, aspects of the systems described herein may be embodied as a system, method, and computer program product. Thus, aspects of the systems described herein may be embodied in entirely hardware, in entirely software (including, but not limited to, firmware, program code, resident software, microcode), or in a combination of hardware and software. All such embodiments may generally be referred to herein as a circuit, a module, or a system. In addition, aspects of the systems described herein may be in the form of a computer program product embodied in one or more computer readable media having computer readable program code embodied thereon.

Any combination of one or more computer readable medium(s) may be utilized. The computer readable medium may be a computer readable signal medium or a computer readable storage medium. The computer readable medium may be a non-transitory computer readable storage medium, examples of which include, but are not limited to, an electronic, magnetic, optical, electromagnetic, infrared, or semiconductor system, apparatus, or device, or any suitable combination thereof.

As used herein, a computer readable storage medium may be any tangible medium that can contain or store a program for use by or in connection with an instruction execution system, apparatus, device, computer, computing system, computer system, or any programmable machine or device that inputs, processes, and outputs instructions, commands, or data. A non-exhaustive list of specific examples of a computer readable storage medium include an electrical connection having one or more wires, a portable computer diskette, a floppy disk, a hard disk, a random access memory (RAM), a read-only memory (ROM), a USB flash drive, an non-volatile RAM (NVRAM or NOVRAM), an erasable programmable read-only memory (EPROM or Flash memory), a flash memory card, an electrically erasable programmable read-only memory (EEPROM), an optical fiber, a portable compact disc read-only memory (CD-ROM), a DVD-ROM, an optical storage device, a magnetic storage device, or any suitable combination thereof.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. As used herein, a computer readable storage medium is not a computer readable propagating signal medium or a propagated signal.

Program code may be embodied as computer-readable instructions stored on or in a computer readable storage medium as, for example, source code, object code, interpretive code, executable code, or combinations thereof. Any standard or proprietary, programming or interpretive language can be used to produce the computer-executable instructions. Examples of such languages include Python, C, C++, Pascal, JAVA, BASIC, Smalltalk, Visual Basic, and Visual C++.

Transmission of program code embodied on a computer readable medium can occur using any appropriate medium including, but not limited to, wireless, wired, optical fiber cable, radio frequency (RF), or any suitable combination thereof.

The program code may execute entirely on a user's device, partly on the user's device, as a stand-alone software package, partly on the user's device and partly on a remote computer or entirely on a remote computer or server. Any such remote computer may be connected to the user's device through any type of network, including a local area network (LAN) or a wide area network (WAN), or the connection may be made to an external computer (for example, through the Internet using an ISP (Internet Service Provider)).

Additionally, the methods described herein can be implemented on a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, or the like. In general, any device capable of implementing a state machine that is in turn capable of implementing the proposed methods herein can be used to implement the principles described herein.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or a VLSI design. Whether software or hardware is used to implement the systems in accordance with the principles described herein is dependent on the speed and/or efficiency requirements of the system, the particular function, and the particular software or hardware systems or microprocessor or microcomputer systems being utilized. The methods illustrated herein however can be readily implemented in hardware and/or software using any known or later developed systems or structures, devices and/or software by those of ordinary skill in the applicable art from the functional description provided herein and with a general basic knowledge of the computer and image processing arts.

Moreover, the disclosed methods may be readily implemented in software executed on programmed general-purpose computer, a special purpose computer, a microprocessor, or the like. In these instances, the systems and methods of the principles described herein may be implemented as program embedded on personal computer such as JAVA® or CGI script, as a resource residing on a server or graphics workstation, as a plug-in, or the like. The system may also be implemented by physically incorporating the system and method into a software and/or hardware system.

While the aforementioned principles have been described in conjunction with a number of embodiments, it is evident that many alternatives, modifications, and variations would be or are apparent to those of ordinary skill in the applicable arts. References to "one embodiment" or "an embodiment" or "another embodiment" means that a particular, feature, structure or characteristic described in connection with the embodiment is included in at least one embodiment described herein. A reference to a particular embodiment within the specification do not necessarily all refer to the same embodiment. The features illustrated or described in connection with one exemplary embodiment may be combined with the features of other embodiments. Accordingly, it is intended to embrace all such alternatives, modifications, equivalents, and variations that are within the spirit and scope of the principles described herein.

What is claimed is:

1. An object-identification system comprising:
an image sensor configured to capture images of objects disposed in an area designated for holding the objects; and
a controller in communication with the image sensor to generate a comparison of one or more submitted images and one or more previous images captured by the image sensor and with a deep neural network, the controller including one or more processors configured to retrain the deep neural network in response to a region of change identified by the comparison, wherein the one or more processors analyze the comparison to identify the region of change by evaluating changes in RGB (Red, Green, Blue) data and/or depth data, and/or objects identified using the deep neural network, by using a combination of the one or more submitted images, the current set of objects identified by the deep neural network, and object information associated with the region of change, wherein the object information associated with the region of change is provided by user-supplied input or detected by barcode or text recognition when the deep neural network fails to identify an object associated with the identified region of change of the one or more submitted images.

2. The object-identification system of claim 1, wherein the controller is further configured to store a version of the submitted images and associated object information in an image database used to retrain the deep neural network.

3. The object-identification system of claim 2, further comprising a human-input acquisition module configured to acquire the object information for an identified region of change from a user in response to a request or alert from the controller when the deep neural network is unable to recognize the detected object in the image in the submitted image.

4. The object-identification system of claim 2, wherein the image database stores a neural network weight file that is applied by the deep neural network during retraining using the subsequent images.

5. The object-identification system of claim 1, wherein the controller is further configured to produce one or more versions of the submitted images that focus upon the identified regions of change in the images, and to submit the one or more versions of the images to the deep neural network to determine whether the deep neural network is able to identify the object associated with the identified regions of change.

6. The object-identification system of claim 5, wherein the controller is further configured to acquire object information associated with the identified regions of change irrespective of whether the deep neural network identifies the object in the one or more versions of the submitted images, to associate the acquired object information with the one or more versions of the images submitted to the deep neural network, and to store the versions of the submitted images and associated object information in an image database used to retrain the deep neural network.

7. The object-identification system of claim 1, wherein the controller is further configured to acquire the object information from the deep neural network when the deep neural network recognizes the object in the one or more versions of the submitted images.

8. The object-identification system of claim 1, wherein the deep neural network is a first deep neural network, and further comprising a second deep neural network configured to operate in parallel to the first deep neural network, each of the first and second deep neural networks producing an output based on image data obtained from the one or more submitted images, wherein the image data obtained by the first deep neural network are different from the image data obtained by the second deep neural network.

9. The object-identification system of claim 1, further comprising a depth sensor acquiring depth pixels value of images within its field of view, wherein any combination of the depth pixels and pixels taken from the group consisting of R (red), G (green), and B (blue) pixels are submitted as image data to the deep neural network when the image is submitted to the deep neural network during training or object recognition.

10. The object-identification system of claim 1, wherein the deep neural network resides on a remote server system, and the controller further comprises a network interface to communicate with the deep neural network on the server system.

11. A method of identifying and tracking objects, the method comprising the steps of:
registering an identity of a person who visits an area designated for holding objects;
capturing an image of the area designated for holding objects;
submitting a version of the image to a deep neural network trained to detect and recognize objects in images like those objects held in the designated area;
detecting an object in the version of the image;
associating the registered identity of the person with the detected object;
retraining the deep neural network using the version of the image if the deep neural network is unable to recognize the detected object; and
tracking a location of the detected object while the detected object is in the area designated for holding objects, wherein the version of the image is a first version of the image, and further comprising:
finding an area within the first version of the image in which a change appears when the deep neural network is unable to recognize the object detected in the first version of the image;
producing a second version of the image that focuses upon the found area of change; and
submitting the second version of the image to the deep neural network to determine whether the deep neural network can recognize the detected object in the second version of the image.

12. The method of claim 11, further comprising:
acquiring labeling information for the object detected in the version of the image in response to the deep neural network being unable to recognize the detected object in the version of the image;
associating the labeling information with the version of the image; and
storing the version of the captured image and associated labeling information in an image database used to retrain the deep neural network.

13. The method of claim 12, wherein the step of acquiring labeling information for the object detected in the version of the image in response to the deep neural network being unable to recognize the detected object in the version of the image comprises acquiring the labeling information from user-supplied input.

14. The method of claim 11, further comprising:
acquiring labeling information for the object detected in the first version of the image irrespective of whether the deep neural network recognizes the detected object in the second version of the image;
associating the labeling information with the first version of the image; and
storing the first version of the captured image and associated labeling information in an image database used to retrain the deep neural network.

15. The method of claim 14, wherein the step of acquiring labeling information for the object detected in the version of the image comprises acquiring the labeling information from the deep neural network when the deep neural network recognizes the detected object in the version of the image.

16. The method of claim 11, wherein the deep neural network is a first deep neural network, and further comprising the step of submitting image data, acquired from the version of the image, to the first deep neural network and a second deep neural network in parallel, wherein the image data submitted to the first deep neural network are different from the image data submitted to the second deep neural network.

17. The method of claim 11, wherein the step of submitting a version of the image to the deep neural network comprises submitting a depth pixel value and less than three pixel values taken from the group consisting of R (red), G (green), and B (blue) as image data to the deep neural network.

18. A sensor module comprising:
an image sensor configured to capture an image within its field of view;
a depth sensor having a field of view that substantially shares the field of view of the image sensor, the depth sensor being configured to acquire estimated depth values for an image captured by the depth sensor; and
a controller in communication with the image sensor and depth sensor to receive image data associated with the image captured by the image sensor and estimated depth values associated with the image captured by the depth sensor, the controller including one or more processors configured to register an identity of a person who visits an area designated for holding objects, to submit the image data associated with the image captured by the image sensor and the estimated depth values associated with the image captured by the depth sensor to a deep neural network trained to detect and recognize objects in images like those objects held in the designated area, to associate the registered identity of the person with an object detected in the image data and estimated depth values submitted to the deep neural network, and to save a version of the images captured by the image sensor and the depth sensor for use in subsequent retraining of the deep neural network if the deep neural network is unable to recognize the detected object, wherein the depth sensor acquires depth pixels value of images within its field of view, wherein a depth pixel value and less than three pixel values taken from the group consisting of R (red), G (green), and B (blue) are submitted as image data to the deep neural network when the image is submitted to the deep neural network during training or object recognition.

19. The sensor module of claim 18, wherein the controller further comprises a cloud interface to communicate with the deep neural network over a network.

20. The sensor module of claim 18, further comprising a human-input acquisition module configured to acquire the labeling information from a user in response to a request from the controller when the deep neural network is unable to recognize the detected object based on the submitted image data and/or estimated depth values.

21. An object-identification system comprising:
an image sensor configured to capture images of objects disposed in an area designated for holding objects;
a deep neural network trained to detect and recognize objects in images like those objects held in the designated area; and
a controller in communication with the image sensor to receive images captured by the image sensor and with the deep neural network, the controller including one or more processors configured to register an identity of a person who visits the area designated for holding objects, to submit an image to the deep neural network, to associate the registered identity of the person with an object detected in the image submitted to the deep neural network, to retrain the deep neural network using the submitted image if the deep neural network is unable to recognize the object detected in the submitted image, and to track a location of the detected object while the detected object is in the area designated for holding objects, wherein the controller is further configured to find an area within the image in which a change appears if the deep neural network is unable to recognize the detected object, to produce a version of the image that focuses upon the area of change, and to submit the version of the image to the deep neural network to determine whether the deep neural network is able to recognize the detected object in the second version of the image.

* * * * *

UNITED STATES PATENT AND TRADEMARK OFFICE
CERTIFICATE OF CORRECTION

PATENT NO. : 11,361,536 B2
APPLICATION NO. : 16/575837
DATED : June 14, 2022
INVENTOR(S) : Chakravarty et al.

Page 1 of 2

It is certified that error appears in the above-identified patent and that said Letters Patent is hereby corrected as shown below:

In the Claims

Column 22, Line 27 (Claim 1):
At the beginning of Line 27, after the word "images," delete "the" and insert --a-- before the word "current".

Column 22, Line 36 (Claim 2):
Insert the phrase --one or more-- after "the" at the end of Line 36.

Column 22, Line 41 (Claim 3):
Delete "an" and insert --the-- in its place in the phrase "for an identified region of".

Column 22, Line 44 (Claim 3):
In the phrase "the detected object", delete "the" and insert --a-- in its place.

Column 22, Line 44 (Claim 3):
Insert the phrase --version of the one or more-- after the phrase "detected object in the", and then delete the phrase "image in the" before the word "submitted" at the end of Line 44.

Column 22, Line 45 (Claim 3):
At the end of the word "image", insert the letter --s--.

Column 22, Line 53 (Claim 5):
Delete the letter "s" from the end of the word "regions", then delete the words "in the" and insert the phrase --of the one or more submitted-- in its place before the word "images,".

Column 22, Line 56 (Claim 5):
Delete the letter "s" from the end of the word "regions" in the phrase "the identified regions"

Signed and Sealed this
Twenty-ninth Day of November, 2022

Katherine Kelly Vidal
*Director of the United States Patent and Trademark Office*

CERTIFICATE OF CORRECTION (continued)
U.S. Pat. No. 11,361,536 B2

Column 22, Line 59 (Claim 6):
Insert --the-- before the phrase "object information".

Column 22, Line 60 (Claim 6):
Delete the letter "s" from the end of the word "regions" in the phrase "regions of change", then insert the phrase --of the one or more submitted images-- after the phrase "regions of change" and before the word "irrespective".

Column 22, Line 65 (Claim 6):
Insert the phrase --one or more-- after the word "the" and before the word "versions".

Column 23, Line 1 (Claim 7):
In the phrase "The object-identification system of claim 1", delete the number "1" and replace it with "5".

Column 24, Line 32 (Claim 17):
Delete "a" and insert --the-- in its place in the phrase "a version of the image".

Column 25, Line 7 (Claim 20):
Delete the word "the" at the end of Line 7.

Column 26, Line 18 (Claim 21):
Delete "the" and insert --a-- in its place in the phrase "in the second" at the end of Line 18.